(12) United States Patent
Nakagawa

(10) Patent No.: US 12,422,770 B2
(45) Date of Patent: Sep. 23, 2025

(54) IMAGE FORMING APPARATUS THAT SETS COOLING TIME OF A FIXING DEVICE

(71) Applicant: SHARP KABUSHIKI KAISHA, Sakai (JP)

(72) Inventor: Takashi Nakagawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/431,020

(22) Filed: Feb. 2, 2024

(65) Prior Publication Data
US 2024/0280932 A1 Aug. 22, 2024

(30) Foreign Application Priority Data
Feb. 16, 2023 (JP) .................... 2023-022046

(51) Int. Cl.
G03G 15/00 (2006.01)
G03G 21/20 (2006.01)
G06F 3/12 (2006.01)

(52) U.S. Cl.
CPC ....... *G03G 15/5012* (2013.01); *G03G 21/206* (2013.01); *G06F 3/1204* (2013.01); *G06F 3/1212* (2013.01); *G06F 3/1254* (2013.01); *G06F 3/126* (2013.01)

(58) Field of Classification Search
CPC .. G03G 15/5012; G03G 21/206; G03G 15/20; G03G 15/2039; G03G 15/205; G03G 21/1685; G03G 15/553; G06F 3/1204; G06F 3/1212; G06F 3/1254; G06F 3/126
See application file for complete search history.

(56) References Cited

U.S. PATENT DOCUMENTS

| | | | |
|---|---|---|---|
| 2013/0142526 A1* | 6/2013 | Numazu | G03G 21/1685 399/21 |
| 2016/0026129 A1* | 1/2016 | Tanaka | G03G 21/1685 399/122 |
| 2021/0303239 A1* | 9/2021 | Oka | G03G 15/553 |

FOREIGN PATENT DOCUMENTS

JP 2000-216577 A 8/2000

\* cited by examiner

*Primary Examiner* — Sandra Brase
(74) *Attorney, Agent, or Firm* — ScienBiziP, P.C.

(57) ABSTRACT

An image forming apparatus includes: an apparatus main body to which a fixing device that thermally fixes a toner image to a recording medium is detachably attached; and one or more controllers that control the apparatus main body, wherein the controllers include a setter that sets predetermined timing as timing at which the fixing device is cooled detachably from the apparatus main body.

7 Claims, 14 Drawing Sheets

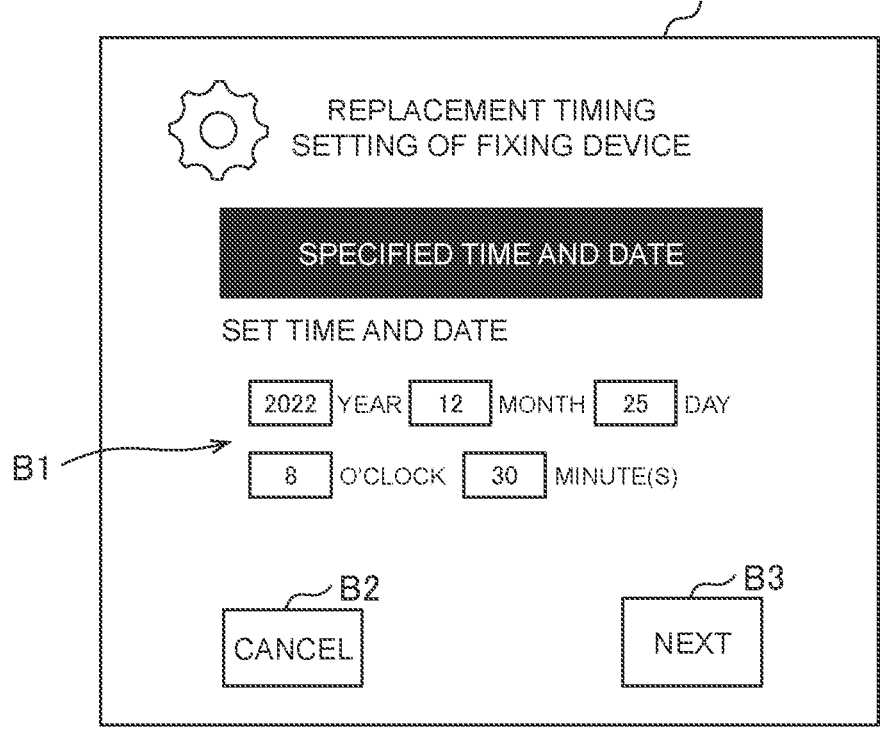
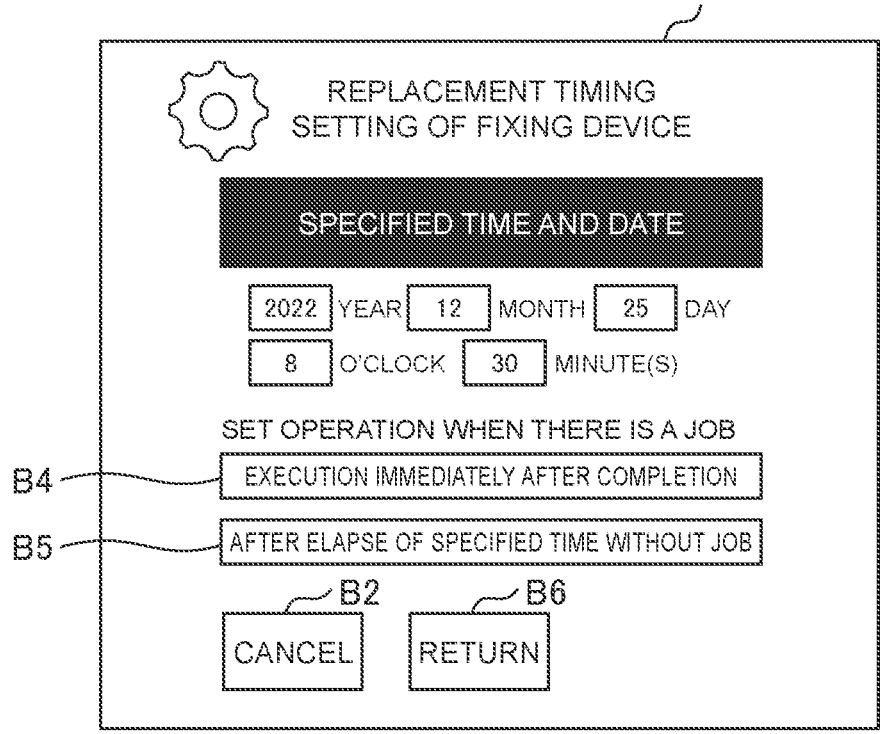

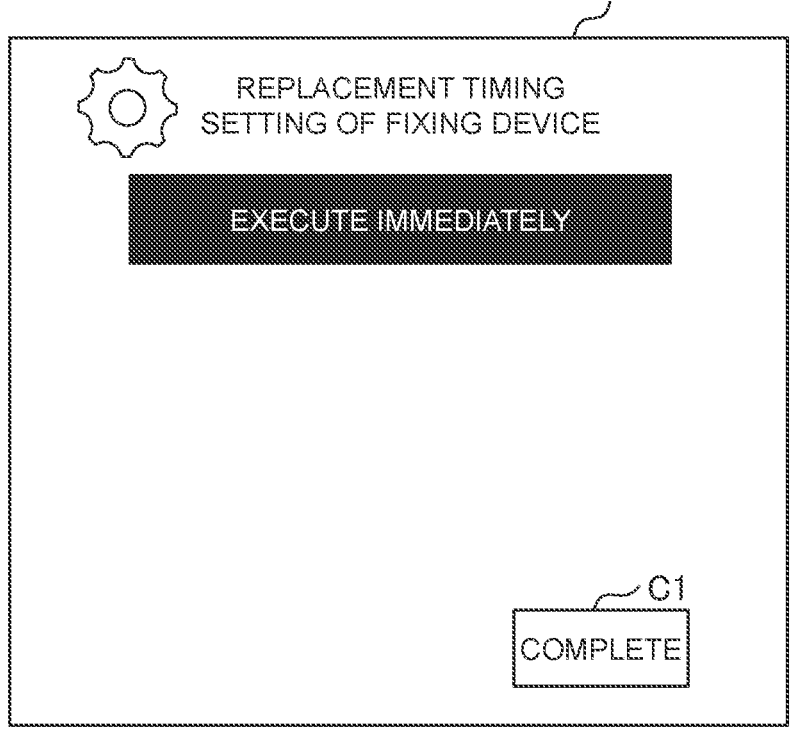

IMAGE FORMING APPARATUS THAT SETS COOLING TIME OF A FIXING DEVICE

CROSS-REFERENCE TO RELATED APPLICATION

The present application claims priority from Japanese Application JP2023-022046, the content of which is hereby incorporated by reference into this application.

BACKGROUND OF THE INVENTION

1. Field of the Invention

This disclosure relates to an image forming apparatus.

2. Description of the Related Art

Conventionally, an image forming apparatus including a fixing device which is detachably attached to an apparatus main body and a cooling fan which cools the fixing device, in which the fixing device is cooled by the cooling fan when the fixing device is detached has been disclosed.

SUMMARY OF THE INVENTION

In the conventional image forming apparatus, in order to cool the fixing device, a user has to give a cooling instruction via an operation acceptor in the apparatus main body, and since the user has to be in the vicinity of the apparatus main body, the fixing device cannot be cooled at desired timing, and convenience gets worse in some cases. Further, since a predetermined time or more is required until the fixing device can be removed after the cooling instruction is given, the user is forced to be brought into such a situation that the fixing device cannot be removed at desired timing.

Therefore, an object of an aspect of this disclosure is to provide an image forming apparatus in which a fixing device can be removed at desired timing.

An image forming apparatus according to an aspect of this disclosure includes an apparatus main body to which a fixing device that thermally fixes a toner image to a recording medium is detachably attached and a controller that controls the apparatus main body, and the controller includes a setter that sets predetermined timing as timing at which the fixing device is cooled so as to be detachable from the apparatus main body.

BRIEF DESCRIPTION OF THE DRAWINGS

FIG. 5 is an example of a confirmation screen when the replacement timing is set to time of power-on.

FIG. 6A is an example of a setting screen on which replacement timing is set to specified time and date.

FIG. 6B is an example of a selection screen on which timing of executing pre-cooling processing is selected when the replacement timing is set to the specified time and date.

FIG. 7 is an example of the confirmation screen when the replacement timing is set to the current timing.

FIG. 11 is a flowchart related to cooling control when the replacement timing is set to the time of power-on.

DETAILED DESCRIPTION OF THE INVENTION

Figure 1:
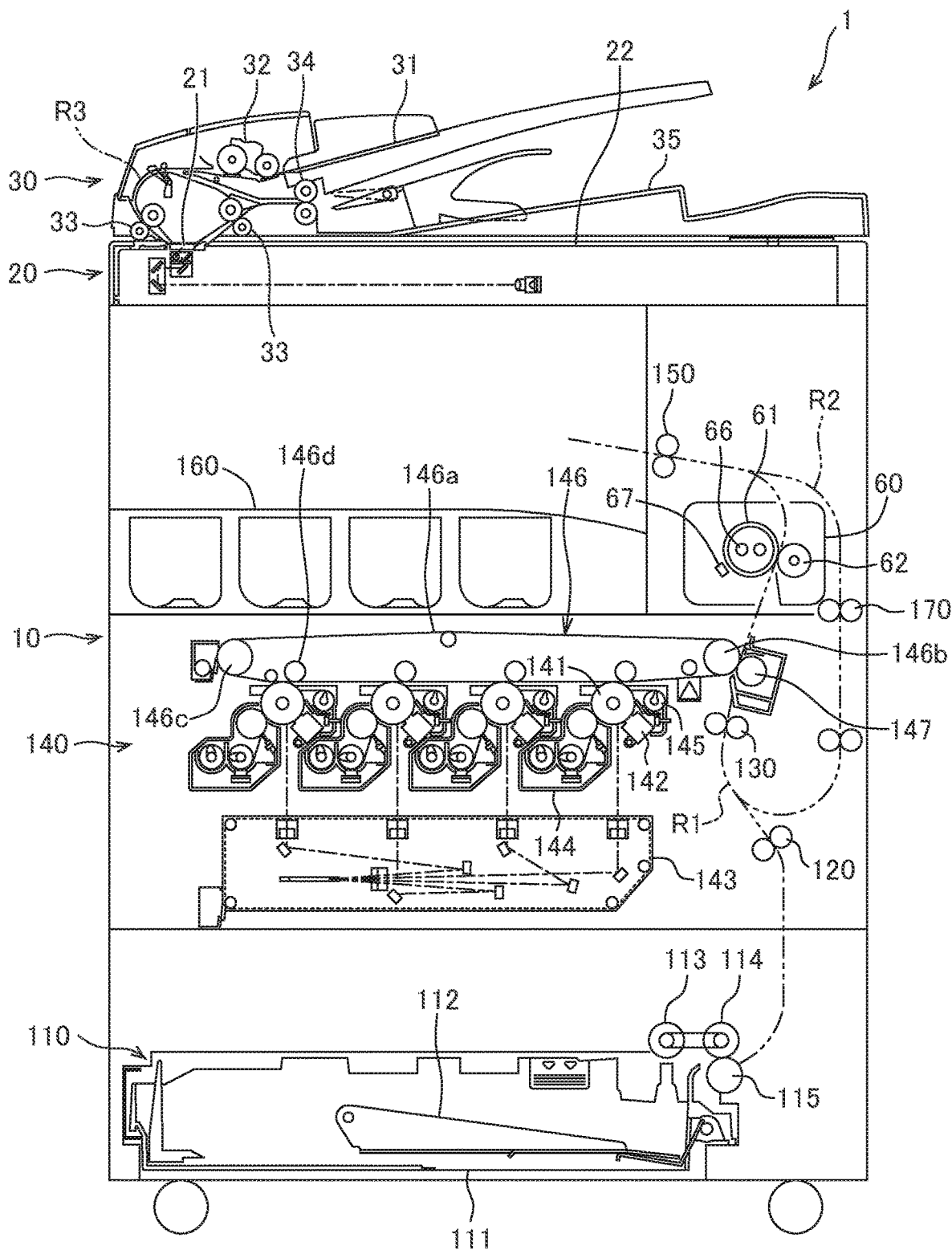
FIG. 1 is a schematic sectional view illustrating an image forming apparatus.

Hereinafter, Embodiments of this disclosure will be described with reference to the accompanying drawings. It is to be noted that, in the drawings, the same or equivalent elements are denoted by the same reference numerals, and the duplicate description will be omitted.

Hereinafter, an image forming apparatus 1 according to an aspect of this disclosure will be described with reference to FIG. 1. FIG. 1 is a schematic sectional view illustrating the image forming apparatus 1. The image forming apparatus 1 is a multifunction machine having a copy function, a printer function, a scanner function, and a facsimile function, for example.

Figure 3:
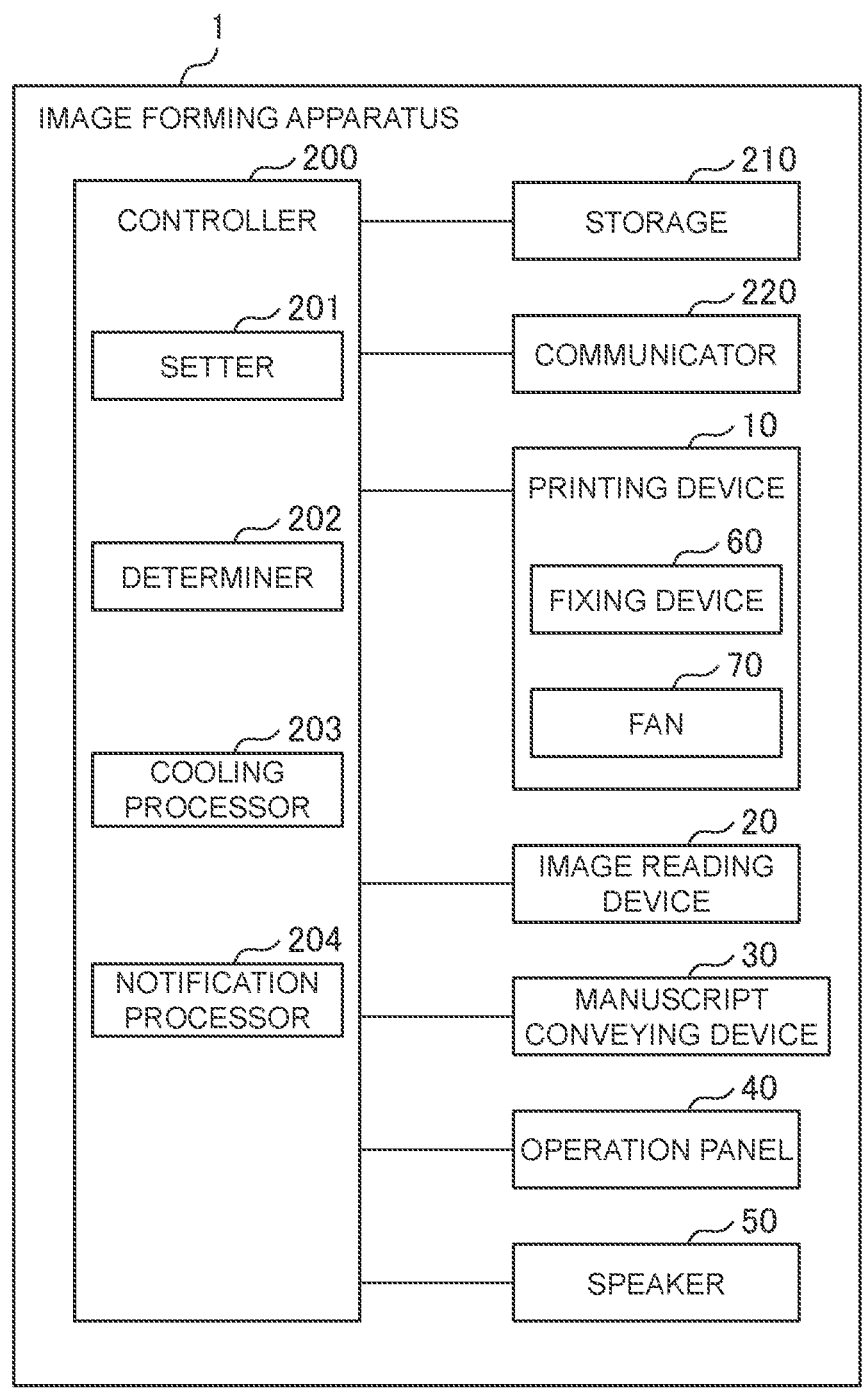
FIG. 3 is a block diagram illustrating a hardware configuration of the image forming apparatus.

The image forming apparatus 1 includes a printing device 10, an image reading device 20, a manuscript conveying device 30, an operation panel 40 (see FIG. 3), and a speaker 50 (see FIG. 3). The image forming apparatus 1 transmits image data read by the image reading device 20 to an outside and forms an image of the read image data of the manuscript or the image data received from the outside on the manuscript in a single color or multiple colors.

The printing device 10 includes a paper feeder 110, a conveyance roller pair 120, a resist roller pair 130, an image former 140, an ejection roller pair 150, and an ejection tray 160. Inside the printing device 10, a conveyance path R1 for sending a sheet fed from the paper feeder 110 to the ejection tray 160 via the conveyance roller pair 120, the resist roller pair 130, the image former 140, and the ejection roller pair 150 is formed.

The paper feeder 110 includes a cassette 111 disposed below the image former 140, a paper feed tray 112 on which sheets are stacked, a pickup roller 113 provided on an upper side on one end of the paper feed tray 112, a paper feed roller 114 disposed on a downstream side of the conveying direction of the sheet of the pickup roller 113 in a sheet conveying direction, and a separation roller 115 in pressure contact with the paper feed roller 114.

In the paper feeder 110, a sheet is fed out of the paper feed tray 112 by the pickup roller 113 and guided to the paper feed roller 114, the sheets are separated one by one by being passed between the paper feed roller 114 and the separation roller 115, and the sheet is conveyed to the conveyance path R1 by the conveyance roller pair 120.

The resist roller pair 130 feed out the sheet in accordance with timing of toner image formation. The resist roller pair 130 temporarily stops the sheet and then, aligns sheet leading end and then, conveys the sheet at transfer timing of the toner image in a nip region between an intermediate transfer belt 146a and a transfer roller 147, which will be described later.

The image former 140 includes a photosensitive drum 141, a charger 142, an exposure unit 143, a developing unit 144, a cleaner unit 145, an intermediate transfer-belt unit 146, the transfer roller 147, and a fixing device 60 and the like.

It is to be noted that the image data handled in the image former 140 corresponds to a color image in four colors of black (K), cyan (C), magenta (M), and yellow (Y). Therefore, the photosensitive drums 141, the chargers 142, the developing units 144, and the cleaner units 145 are provided four each so as to form four kinds of latent images corresponding to the respective colors, thereby constituting four image forming stations. Four toner cartridges are provided so that toners corresponding to the respective image forming stations can be supplied.

The photosensitive drum 141 is an electrostatic latent image carrier in which a photosensitive layer is formed on a surface of a cylindrical substrate having conductivity. The charger 142 charges the surface of the photosensitive drum 141 to a predetermined potential. The exposure unit 143 is a laser scanning unit including a laser emitter, a reflection mirror, and the like. The exposure unit 143 forms an electrostatic latent image corresponding to the image data on the surface of the photosensitive drum 141 by exposing the charged surface of the photosensitive drum 141. The developing unit 144 visualizes the electrostatic latent image formed on the surface of the photosensitive drum 141 with toners in four colors. The cleaner unit 145 removes and collects the toner remaining on the surface of the photosensitive drum 141 after development and image transfer.

The intermediate transfer-belt unit 146 includes the intermediate transfer belt 146a, a drive roller 146b, a driven roller 146c, four intermediate transfer rollers 146d, and the like. The intermediate transfer-belt unit 146 is disposed above the photosensitive drum 141. The intermediate transfer belt 146a is provided so as to be in contact with the respective photosensitive drums 141, and the toner images in the respective colors formed on the corresponding photosensitive drums 141 are sequentially transferred onto the intermediate transfer belt 146a in a superimposed manner by using the respective intermediate transfer rollers 146d, whereby the toner images are formed on the intermediate transfer belt 146a.

The transfer roller 147 is disposed in the vicinity of the drive roller 146b in the conveyance path R1. When the sheet passes through the nip region between the transfer roller 147 and the intermediate transfer belt 146a, the toner image formed on the intermediate transfer belt 146a is transferred onto the sheet.

The fixing device 60 thermally fixes the toner image to the sheet. The fixing device 60 is provided detachably to the printing device 10 (apparatus main body). The fixing device 60 is disposed above the transfer roller 147, in other words, on the downstream side in a sheet conveyance direction in the conveyance path R1. When the sheet passes through the fixing device 60, the toner image is thermally fixed to the sheet. The sheet on which the toner image was fixed is conveyed to the ejection tray 160 by the ejection roller pair 150. A specific configuration of the fixing device 60 will be described later.

Moreover, when an image is formed not only on a front side of the sheet but also on a back side thereof, the sheet is conveyed in an opposite direction from the ejection roller pair 150 to an inverting path R2. In the inverting path R2, the sheet is inverted through an inverting roller pair 170, and is guided again to the resist roller pair 130. Thereafter, the sheet on which the image was formed on the back side in the same manner as the front side is conveyed to the ejection tray 160.

The image reading device 20 reads an image formed on a sheet and generates image data. A transparent plate-like feed-reading contact glass 21 is provided on a left side of an upper surface of the image reading device 20. A transparent plate-like placement-reading contact glass 22 is provided on the upper surface of the image reading device 20 and on the right side of the feed-reading contact glass 21A. Above the image reading device 20, a manuscript conveying device 30 is attached capable of being opened/closed via a hinge or the like. When the manuscript conveying device 30 is opened via a hinge or the like, the upper surface of the image reading device 20 is opened, and a manuscript can be manually placed on the placement-reading contact glass 22. An operation panel 40 (see FIG. 3) is provided on a front side of the upper surface of the image reading device 20. The operation panel 40 is an example of a display operation acceptor, and includes a display panel, a touch panel, hard keys, and the like. A speaker 50 (see FIG. 3) is provided in the vicinity of the operation panel 40. The speaker 50 is an example of a sound output unit.

The image reading device 20 further includes a light source, a plurality of mirrors, an imaging lens, a line sensor, and the like. The image reading device 20 exposes the surface of the sheet by the light source and guides reflected light reflected from the surface of the sheet to the imaging lens by the plurality of mirrors. Then, the reflected light is focused on a light receiving element of the line sensor by the imaging lens. The line sensor detects luminance or chromaticity of the reflected light imaged on the light receiving element, and image data based on an image on the surface of the sheet is generated. As the line sensor, a CCD, a CIS, or the like is used.

The manuscript conveying device 30 includes a paper feed tray 31, a paper feed unit 32, a conveyance roller pair 33, an ejection roller pair 34, and an ejection tray 35. Inside the manuscript conveying device 30, a conveyance path R3 is formed for conveying a sheet fed from the paper feed unit 32 to the ejection tray 35 via the conveyance roller pair 33, the image reading device 20, and the ejection roller pair 34.

The paper feed tray 31 is a tray on which a plurality of manuscripts can be stacked and placed. The paper feed tray 31 can be elevated up and down by an elevating mechanism (not shown). The ejection tray 35 is a tray on which a plurality of manuscripts can be stacked and placed. The paper feed unit 32 conveys a sheet on the paper feed tray 31 toward the conveyance path R3.

The conveyance roller pair 33 conveys the sheet on the conveyance path R3 toward the image reading device 20.

The ejection roller pair 34 conveys the sheet on the conveyance path R3 toward the ejection tray 35.

Figure 2:
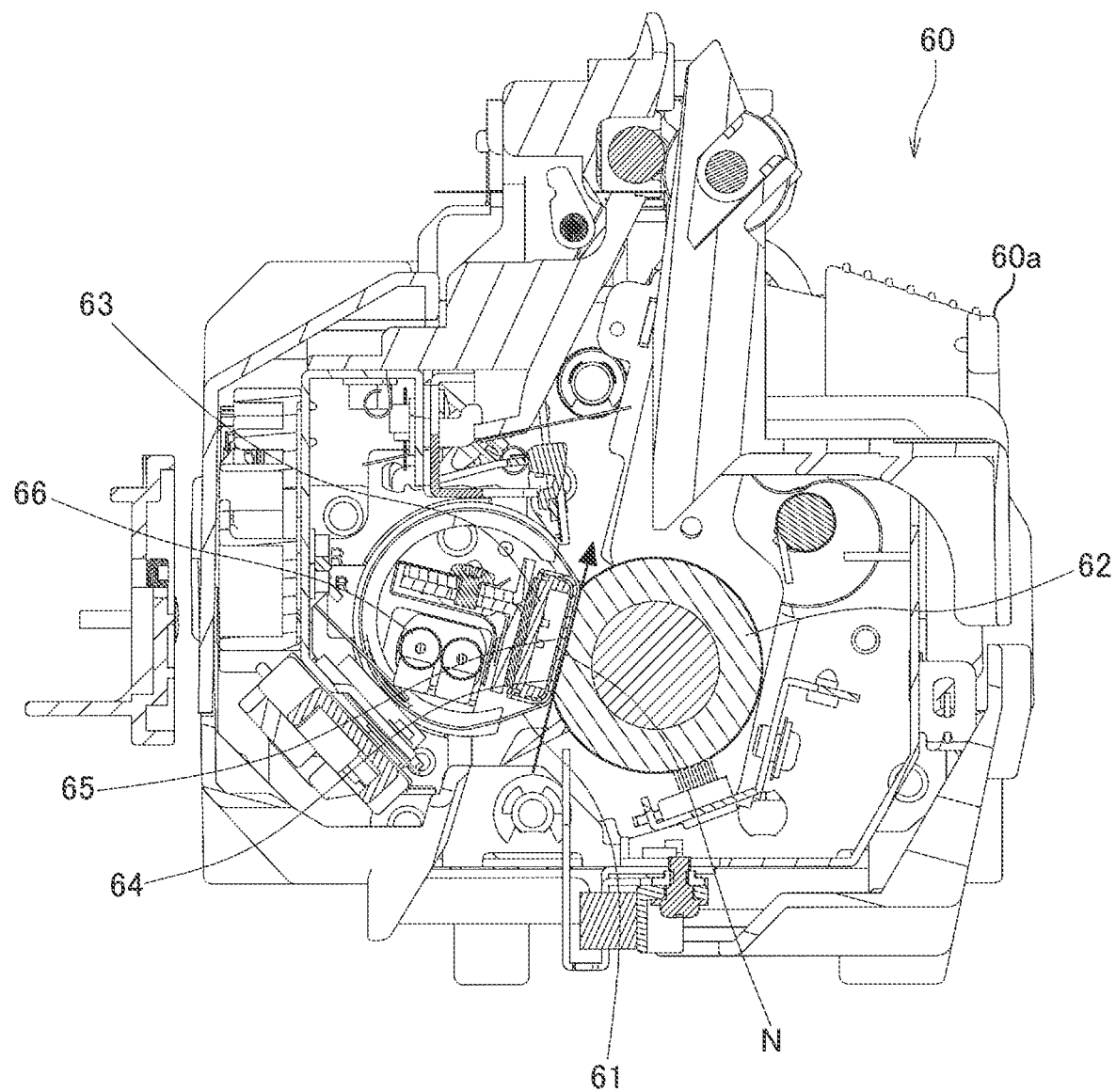
FIG. 2 is a cross-sectional view of a fixing device.

A specific configuration of the fixing device 60 will be explained by using FIG. 2. FIG. 2 is a cross-sectional view of the fixing device 60.

The fixing device 60 mainly includes a fixing belt (heating rotating body) 61 and a pressure roller (pressure rotating body) 62. In the fixing device 60, a sheet is conveyed to a nip region N formed by the fixing belt 61 and the pressure roller 62 in a direction indicated by an arrow in the drawing.

In the fixing belt 61, a fixing pad 63, a pad heat-transfer plate 64 provided on the fixing pad 63, a sliding sheet (sliding member) 65 provided between the pad heat-transfer plate 64 and the fixing belt 61, a heater lamp 66 serving as a heat source, and the like are provided.

The fixing device 60 includes a housing 60a that houses various components. In the housing 60a, the fixing belt 61, the pressure roller 62, a temperature sensor 67 (see FIG. 1) that detects a peripheral surface temperature of the fixing belt 61, and the like are provided. The temperature sensor 67 is, for example, a thermistor. The fixing belt 61 is heated to a predetermined fixing temperature (for example, 170° C.) by the heater lamp 66. Moreover, the pressure roller 62 is provided so as to press the fixing belt 61 between it and the fixing pad 63. When the sheet passes through the nip region N between this pressure roller 62 and the fixing belt 61, the toner image transferred to the sheet is melted, mixed, and pressed into contact, and the toner image is thermally fixed to the sheet.

A fan 70 (see FIG. 3) that cools the fixing device 60 is provided in the vicinity of the fixing device 60 in the printing device 10. The fan 70 sucks air around the fixing device 60 and discharges it to an outside of the printing device 10 (apparatus main body).

It is to be noted that the fan 70 is preferably provided in the vicinity of the fixing device 60 of the printing device 10, but is not limited thereto, and the fan 70 may be provided at any appropriate spot inside the printing device 10 as long as the fixing device 60 can be cooled by circulating the air inside the printing device 10.

A hardware configuration of the image forming apparatus 1 will be explained with reference to FIG. 3. FIG. 3 is a block diagram illustrating a hardware configuration of the image forming apparatus 1.

The image forming apparatus 1 includes the printing device 10 including a controller 200, a storage 210, a communicator 220, the fixing device 60 and the fan 70, the image reading device 20, the manuscript conveying device 30, the operation panel 40, the speaker 50, and the like.

The controller 200 controls the image forming apparatus 1. The controller 200 realizes various functions by reading and executing various programs stored in the storage 210. The controller 200 includes, for example, one or a plurality of central processing units (CPUs) and the like.

The storage 210 stores various programs and various kinds of data required for the operation of the image forming apparatus 1. The storage 210 is configured, for example, by a storage device such as a Solid State Drive (SSD) which is a semiconductor memory or a Hard Disk Drive (HDD).

The communicator 220 controls wireless communication of various kinds of data with an external terminal such as a computer, for example. It is to be noted that the communicator 220 is not limited to one that controls wireless communication, and may be one that controls wired communication.

The controller 200 is connected to the printing device 10 including the storage 210, the communicator 220, the fixing device 60, and the fan 70, the image reading device 20, the manuscript conveying device 30, the operation panel 40, the speaker 50, and the like.

The controller 200 can form an image of image data read by the image reading device 20 or image data received through the communicator 220 on a manuscript in a single color or multiple colors by controlling the printing device 10. Further, the controller 200 can read image data of a manuscript by controlling the image reading device 20 and the manuscript conveying device 30.

The controller 200 includes a setter 201, a determiner 202, a cooling processor 203, and a notification processor 204.

The setter 201 can set predetermined timing (hereinafter, also referred to as replacement timing) as timing at which the fixing device 60 is cooled so as to be detachable in accordance with an operation input received by the operation panel 40. At the replacement timing, when the temperature of the fixing device 60 is lowered to a temperature at which the fixing device 60 can be removed, the fixing device 60 can be removed as it is. Further, at the replacement timing, in the case where the temperature of the fixing device 60 is not lowered to the temperature at which the fixing device 60 can be removed, by cooling the fixing device 60 to lower the temperature of the fixing device 60 to the temperature at which the fixing device 60 can be removed, the fixing device 60 can be removed. It is to be noted that the setter 201 may set the replacement timing of the fixing device 60 in accordance with input information received via the communicator 220.

The setter 201 can set, as the replacement timing, for example, power-on time, time and date specified by the user, current timing, print job completion timing, and the like.

The determiner 202 executes determination processing of determining whether or not a detection result of the temperature sensor 67 is equal to or less than a predetermined threshold value at the replacement timing set by the setter 201. The predetermined threshold value is, when the fixing device 60 is removed from the printing device 10, a threshold value at which the temperature of a part of the fixing device 60 that can be touched by a user (for example, the housing 60a that is an exterior part of the fixing device 60) becomes or is estimated to become a temperature (also referred to as a specified temperature) at which an adverse effect such as burning does not occur. In this Embodiment, since the temperature sensors 67 detect the peripheral surface temperature of the fixing belt 61, the detection results of the temperature sensors 67 are higher than the temperature of the 60a of the housing of the fixing device 60. Therefore, the temperature of the housing 60a of the fixing device 60 is estimated from the detection result of the temperature sensor 67, and the predetermined threshold value may be determined so that the estimated temperature becomes a temperature (specified temperature) at which an adverse effect such as a burn does not occur.

When the determiner 202 determines that the detection result of the temperature sensor 67 exceeds the predetermined threshold value, the cooling processor 203 executes the cooling processing of the fixing device 60. The cooling processing of the fixing device 60 refers to at least stopping drive of the heater lamp 66 constituting the fixing device 60. In this Embodiment, the cooling processor 203 stops the drive of the heater lamp 66 and drives the fan 70 as the cooling processing of the fixing device 60.

When the determiner 202 determines that the detection result of the temperature sensor 67 is equal to or less than the predetermined threshold value, the notification processor 204 controls the operation panel 40 so as to display at least either one of a message indicating that the fixing device 60 can be replaced and a message indicating that the cooling of the fixing device 60 is completed. It is to be noted that the notification processor 204 may notify the user that the fixing device 60 can be replaced or that the cooling of the fixing device 60 is completed, and for example, may blink a lamp indicating that the fixing device 60 can be replaced or may output a sound of a message indicating that the fixing device 60 can be replaced by controlling the speaker 50, without being limited to the display of the message.

As described above, since the replacement timing can be set to, for example, the power-on time, the specified time and date, or the like at which the temperature of the fixing device 60 is expected to be low, the waiting time for removing the fixing device 60 (time for executing the cooling processing of the fixing device 60) can be made zero or shortened. Therefore, smooth removal (replacement) of the fixing device 60 can be realized at timing desired by the user.

Further, the controller 200 can restrict the execution of the print job within a predetermined period until the replacement timing. For example, the controller 200 may prohibit execution of all print jobs within the predetermined period, or may execute only some of the print jobs and prohibit execution of the other print jobs. As a result, since the temperature rise of the fixing device 60 due to the execution of the print job can be prevented before the replacement timing, the temperature of the fixing device 60 can be lowered at the replacement timing. Therefore, at the replacement timing, the waiting time for removing the fixing device 60 (time for executing the cooling processing) can be made zero or shortened so that smooth removal (replacement) of the fixing device 60 can be realized.

It is to be noted that, in a case where the controller 200 restricts execution of a print job within a predetermined period, for example, execution of an image reading job such as Scant to URL or a FAX transmission job is not restricted and thus, it is possible to suppress lowering of convenience. Further, in a case where the execution of the print job is restricted within a predetermined period, the controller 200 may output information indicating that the execution of the print job is restricted within the predetermined period using the operation panel 40 or the speaker 50. As a result, it is possible to notify the user who uses the image forming apparatus 1 of information indicating that the execution of the print job is restricted.

It is to be noted that the controller 200 restricts execution of a print job within a predetermined period until the replacement timing is reached, but this is not limiting, and for example, reception of a print job may be restricted. Specifically, acceptance of a print job from the operation panel 40 and reception of a print job via the communicator 220 may be restricted. Even in this case, since the execution of the print job is restricted, smooth removal (replacement) of the fixing device 60 can be realized.

Further, the cooling processor 203 can execute the pre-cooling processing of setting the temperature of the fixing device 60 to a second temperature lower than a first temperature set at the time of waiting for the print job within the predetermined period until the replacement timing set in the setter 201 is reached. Specifically, the cooling processor 203 adjusts the temperature of the fixing device 60 to the second temperature by controlling the drive of the heater lamp 66.

As a result, the temperature of the fixing device 60 can be lowered in advance before the replacement timing. Therefore, at the replacement timing, the waiting time for removing the fixing device 60 (time for executing the cooling processing) can be shortened so that smooth removal (replacement) of the fixing device 60 can be realized.

Further, when there is a print job within a predetermined period until the replacement timing set by the setter 201 is reached, the setter 201 can set the timing of executing the pre-cooling processing to either one of the timing immediately after the completion of the print job and the timing after the elapse of specified time without receiving a new print job after the completion of the print job.

As a result, by setting the timing of executing the pre-cooling processing to the timing immediately after the completion of the print job, even if the subsequent print job has been received, the execution of the pre-cooling processing can be prioritized over the execution of the subsequent print job. Further, by setting the timing of executing the pre-cooling processing to the timing at which the specified time has elapsed without receiving a new print job after the print job is completed, it is possible to prioritize the execution of the subsequent print job over the execution of the pre-cooling processing in a case where the subsequent print job has been received.

Figure 4:
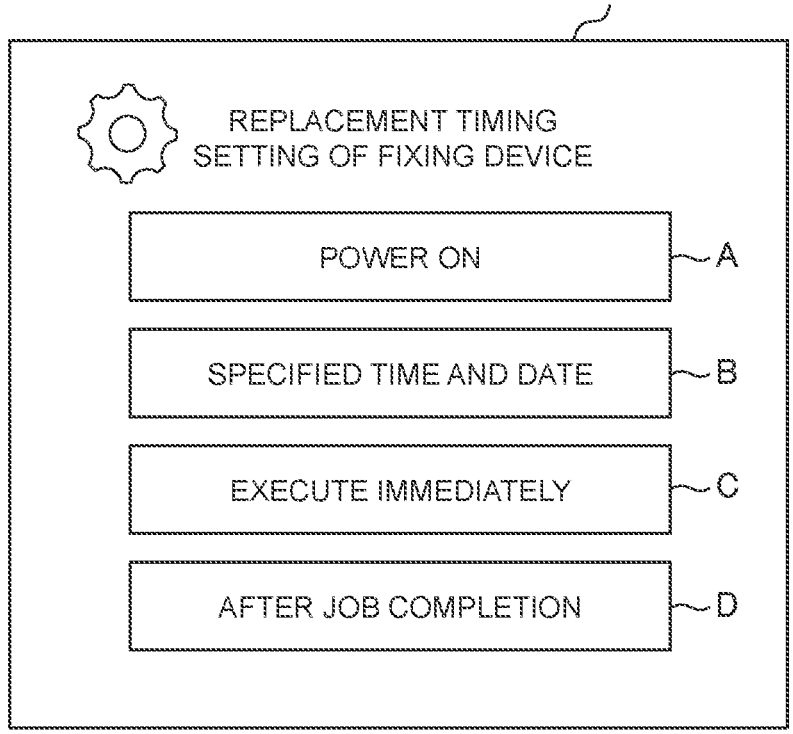
FIG. 4 is an example of a selection screen for replacement timing of the fixing device.

A screen for selecting the replacement timing of the fixing device 60 will be explained with reference to FIG. 4. FIG. 4 shows a selection screen of the replacement timing displayed on the operation panel 40.

As shown in FIG. 4, a plurality of replacement timings are displayed on the selection screen. Specifically, characters that "Replacement timing setting of fixing device" are displayed, and a button A corresponding to "Power On", a button B corresponding to "Specified time and date", a button C corresponding to "Execute immediately", and a button D corresponding to "After job completion" are displayed. When the user touches a desired button, the setter 201 sets the replacement timing corresponding to the button.

Figure 5:
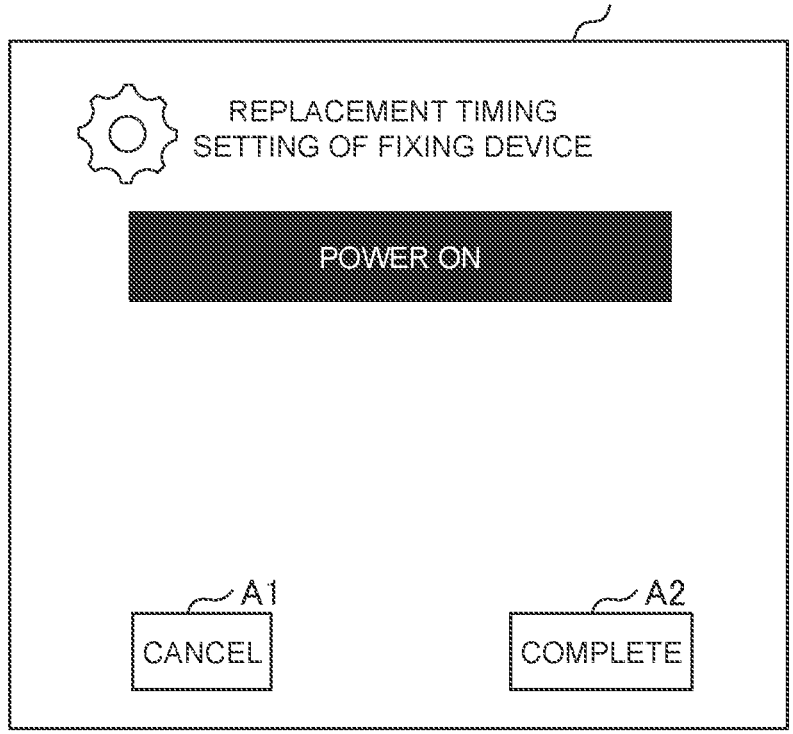

When the button A corresponding to "Power On" shown in FIG. 4 is touched, the selection screen shown in FIG. 4 shifts to a confirmation screen shown in FIG. 5. FIG. 5 is an example of the confirmation screen when the replacement timing is set to time of "Power On". As shown in FIG. 5, on the confirmation screen, the characters that "Replacement timing setting of fixing device" are displayed, information indicating that "Power ON" was selected (for example, reverse display of a character color and a background color) is displayed, a button A1 corresponding to "Cancel" is displayed on the lower left, and a button A2 corresponding to "Complete" is displayed on the lower right. When the user touches the button A1 corresponding to "Cancel", the screen returns to the selection screen illustrated in FIG. 4, while when the user touches the button A2 corresponding to "Complete", the setter 201 sets the replacement timing of the fixing device 60 to the time of power ON (turned on), and the setting of the replacement timing is completed.

When the button B corresponding to the "Specified time and date" shown in FIG. 4 is touched, the selection screen shown in FIG. 4 shifts to the setting screen shown in FIG. 6A. FIG. 6A is an example of the setting screen on which the replacement timing is set to specified time and date. As shown in 6A, on the setting screen, the characters that "Replacement timing setting of fixing device" are displayed, the information indicating that "Specified time and date" was selected (for example, the reverse display of the character color and the background color) is displayed, and a box B1 in which date, month, year, and time are input is displayed together with characters "Set time and date". Further, a button B2 corresponding to "Cancel" is displayed on the lower left, and a button B3 corresponding to "Next" is displayed on the lower right. When the user touches the button B2 corresponding to "Cancel", the screen returns to the selection screen shown in FIG. 4, and when the user inputs the date, month, year, and time in the box B1 and touches the button B3 corresponding to "Next", the screen shifts to the selection screen shown in FIG. 6B.

FIG. 6B is an example of the selection screen on which the timing of executing the pre-cooling processing is set when the replacement timing is set to the specified time and date. In this Embodiment, when there is a print job within a predetermined period until the specified time and date input by the user are reached, timing immediately after the completion of the print job or timing at which specified time has elapsed without receiving a new print job after the completion of the print job can be selected as the timing of executing the pre-cooling processing. It is to be noted that, in a case where there is no print job within the predetermined period until the specified time and date input by the user are reached, the pre-cooling processing shall be executed.

Figure 6C:
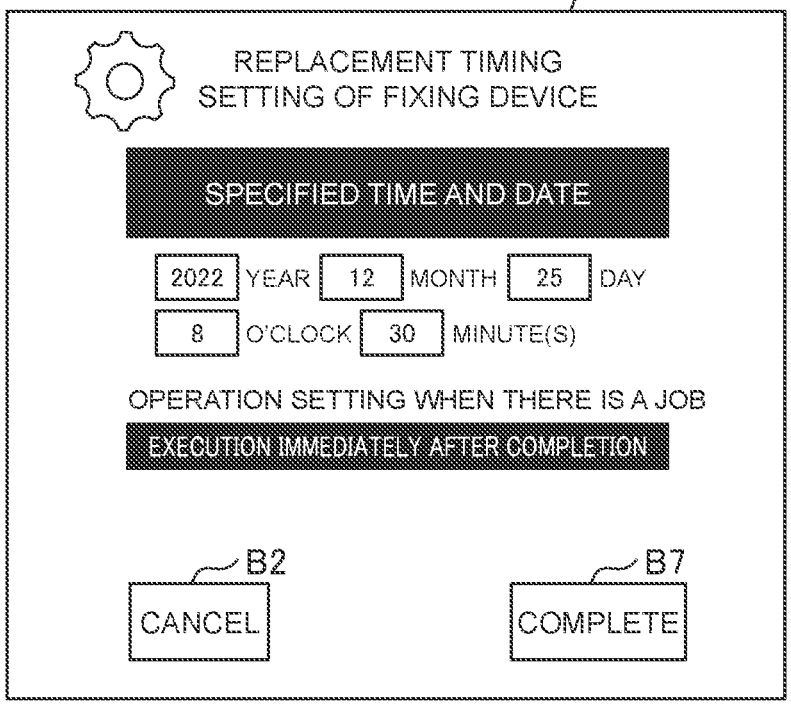
FIG. 6C is an example of the confirmation screen when the timing of executing the pre-cooling processing is set to timing immediately after completion of a print job.

As shown in FIG. 6B, on the selection screen, the characters that "Replacement timing setting of fixing device" are displayed, information indicating that "Specified time and date" was selected (for example, the reverse display of the character color and the background color) is displayed, and the specified time and date input in FIG. 6A is displayed. Further, on the selection screen, characters that "Set operation when there is a job" are displayed, and a button B4 corresponding to "Execution immediately after completion" and a button B5 corresponding to "After elapse of specified time without job" are displayed. The "Execution immediately after completion" shown in FIG. 6B indicates that the pre-cooling processing is executed at timing immediately after the print job is completed. Further, "After elapse of specified time without job" shown in FIG. 6B indicates that the pre-cooling processing is executed at timing when specified time has elapsed without receiving a new print job after completion of a print job. Further, the button B2 corresponding to "Cancel" is displayed on the lower left, and a button B6 corresponding to "Return" is displayed at the lower center. When the user touches the button B2 corresponding to "Cancel", the screen returns to the selection screen shown in FIG. 4, when the user touches the button B6 corresponding to "Return", the screen returns to the setting screen shown in FIG. 6A, when the user touches the button B4 corresponding to "Execution immediately after completion", the screen shifts to the confirmation screen shown in FIG. 6C, and when the user touches the button B5 corresponding to "After elapse of specified time without job", the screen shifts to the confirmation screen shown in FIG. 6D.

FIG. 6C is an example of the confirmation screen at the time of "Execution immediately after completion" setting. As shown in FIG. 6C, the characters that "Replacement timing setting of fixing device" are displayed, information indicating that "Specified time and date" was selected (for example, the reverse display of the character color and the background color) is displayed, and information related to the specified time and date input in FIG. 6A is displayed. Further, on the confirmation screen, information indicating that "Execution immediately after completion" was selected (for example, the reverse display of the character color and the background color) is displayed. Further, on the confirmation screen, the button B2 corresponding to "Cancel" is displayed on the lower left, and a button B7 corresponding to "Complete" is displayed on the lower right. When the user touches the button B2 corresponding to "Cancel", the screen returns to the selection screen shown in FIG. 4, and when the user touches the button B7 corresponding to "Complete", the setter 201 sets the replacement timing of the fixing device 60 to the "specified time and date" input by the user and sets the timing of executing the pre-cooling processing to "Execution immediately after completion", and the setting of the replacement timing is completed.

Figure 6D:
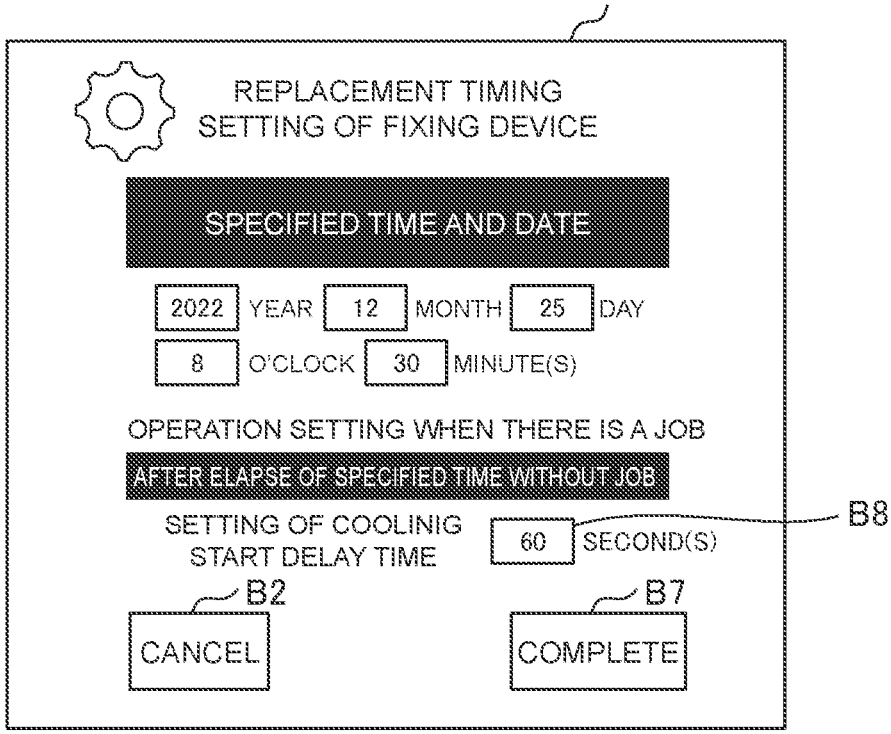
FIG. 6D is an example of the confirmation screen when the timing of executing the pre-cooling processing is set to timing at which the specified time has elapsed without receiving a new print job after the completion of a print job.

FIG. 6D is an example of the confirmation screen at the time of setting "After elapse of specified time without job". As shown in FIG. 6D, the characters that "Replacement timing setting of fixing device" are displayed, information indicating that "Specified time and date" was selected (for example, the reverse display of the character color and the background color) is displayed, and information related to the specified time and date input in FIG. 6A is displayed. Further, on the confirmation screen, information (for example, the reverse display of the character color and the background color) indicating that "After elapse of specified time without job" was selected is displayed. Further, a box B8 in which the cooling-start delay time is input is displayed on the confirmation screen. The cooling start delay time is time that elapses from completion of a print job without receiving a new print job. In this Embodiment, for example, the cooling-start delay time is set to 60 seconds. Further, on the confirmation screen, the button B2 corresponding to "Cancel" is displayed on the lower left, and a button B7 corresponding to "Complete" is displayed on the lower right. When the user touches the button B2 corresponding to "Cancel", the screen returns to the selection screen shown in FIG. 4, and when the user inputs the cooling-start delay time in the box B8 and touches the button B7 corresponding to "Complete", the setter 201 sets the replacement timing of the fixing device 60 to the "Specified time and date" input by the user and sets the timing of executing the pre-cooling processing to "After elapse of specified time without job", and the setting of the replacement timing is completed.

When the button C corresponding to "Execute immediately" shown in FIG. 4 is touched, the selection screen shown in FIG. 4 shifts to the confirmation screen shown in FIG. 7. FIG. 7 is an example of the confirmation screen when the replacement timing is set to "Execute immediately". As shown in FIG. 7, on the confirmation screen, the characters that "Replacement timing setting of fixing device" are displayed, information indicating that "Execute immediately" was selected (for example, reverse display of the character color and the background color) is displayed, and a button C1 corresponding to "Complete" is displayed on the lower right. When the user touches the button C1 corresponding to "Complete", the setter 201 sets the replacement timing of the fixing device 60 to the current timing, and the setting of the replacement timing is completed.

Figure 8A:
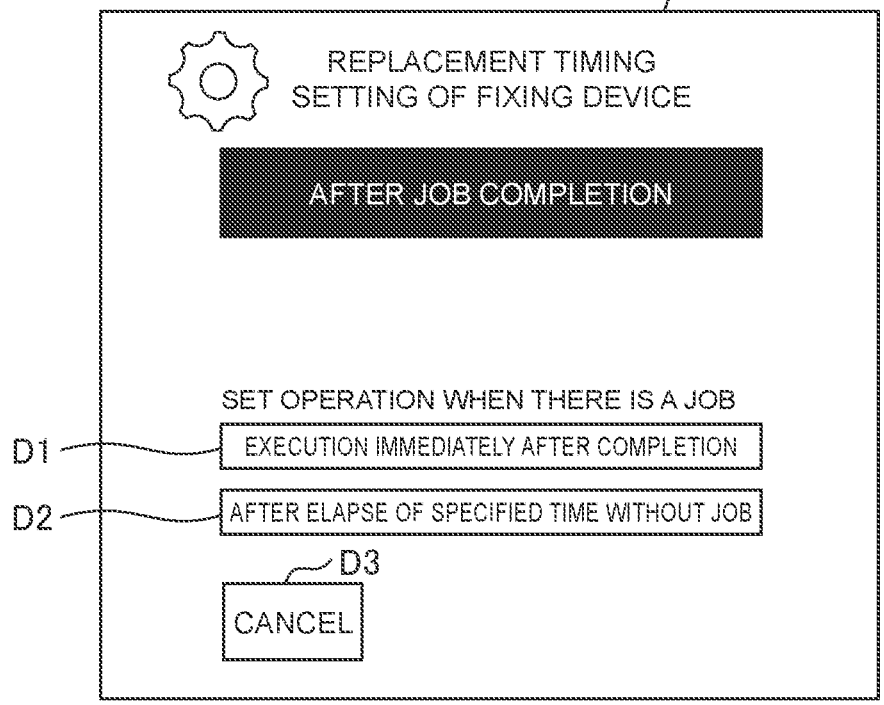
FIG. 8A is an example of the selection screen when the replacement timing is set after completion of the print job.

When the button D corresponding to the "After job completion" shown in FIG. 4 is touched, the selection screen shown in FIG. 4 shifts to the selection screen shown in FIG. 8A. FIG. 8A is an example of the selection screen when the replacement timing was set after completion of the print job. In this Embodiment, as the replacement timing, it is possible to select timing immediately after the completion of the print job or timing when specified time has elapsed without receiving a new print job after the completion of the print job.

As shown in FIG. 8A, on the selection screen, the characters that "Replacement timing setting of fixing device" are displayed, and information indicating that "After job completion" was selected (for example, reverse display of the character color and the background color) is displayed. Further, on the selection screen, the characters that "Set operation when there is a job" are displayed, and a button D1 corresponding to "Execution immediately after completion" and a button D2 corresponding to "After elapse of specified time without job" are displayed. The "Execution immediately after completion" shown in FIG. 8A indicates that the cooling processing is executed if the temperature of the fixing device 60 exceeds a specified temperature at the timing immediately after the completion of the print job. Further, "After elapse of specified time without job" shown in FIG. 8A indicates that the cooling processing is executed if the temperature of the fixing device 60 exceeds the specified temperature at timing when the specified time has elapsed without receiving a new print job after completion of the print job. Further, a button D3 corresponding to "Cancel" is displayed on the lower left of the selection screen. When the user touches the button D3 corresponding to "Cancel", the screen returns to the selection screen shown in FIG. 4, when the user touches the button D1 corresponding to "Execution immediately after completion", the screen shifts to the confirmation screen shown in FIG. 8B, and when the user touches the button D2 corresponding to "After elapse of specified time without job", the screen shifts to the confirmation screen shown in FIG. 8C.

Figure 8B:
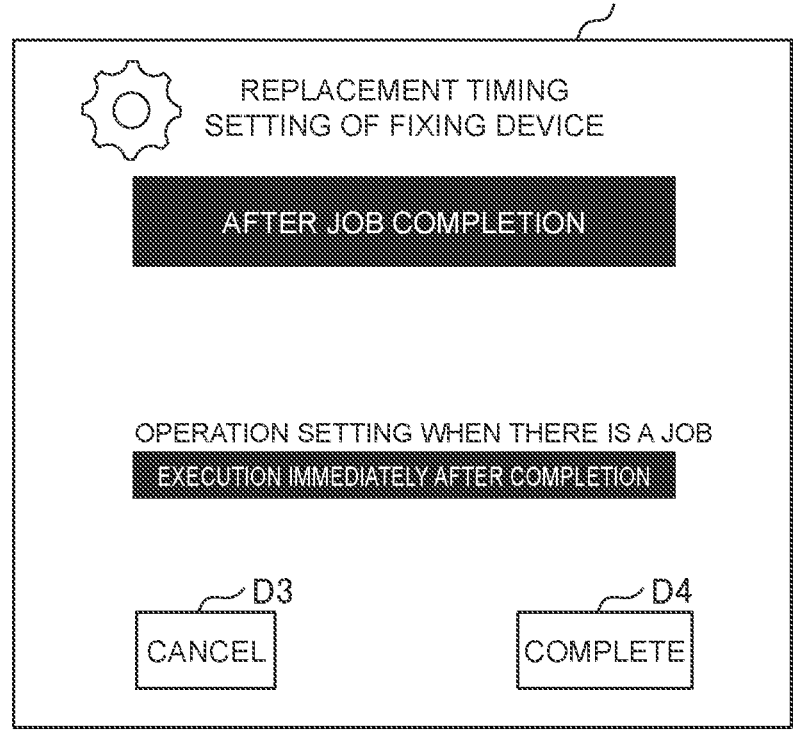
FIG. 8B is an example of the confirmation screen when the replacement timing is set to timing immediately after the completion of the print job.

FIG. 8B is an example of the confirmation screen at the time of setting "Execution immediately after completion". As shown in FIG. 8B, the characters that "Replacement timing setting of fixing device" are displayed. Further, on the confirmation screen, information indicating that "After completion of job" was selected (for example, reverse display of the character color and the background color) is displayed, and information indicating that "Execution immediately after completion" was selected (for example, reverse display of the character color and the background color) is displayed. Further, on the confirmation screen, the button D3 corresponding to "Cancel" is displayed on the lower left, and the button D4 corresponding to "Complete" is displayed on the lower right. When the user touches the button D3 corresponding to "Cancel", the screen returns to the selection screen shown in FIG. 4, and when the user touches the button D4 corresponding to "Complete", the setter 201 sets the replacement timing to "After job completion" and "Execution immediately after completion", and the setting of the replacement timing is completed.

Figure 8C:
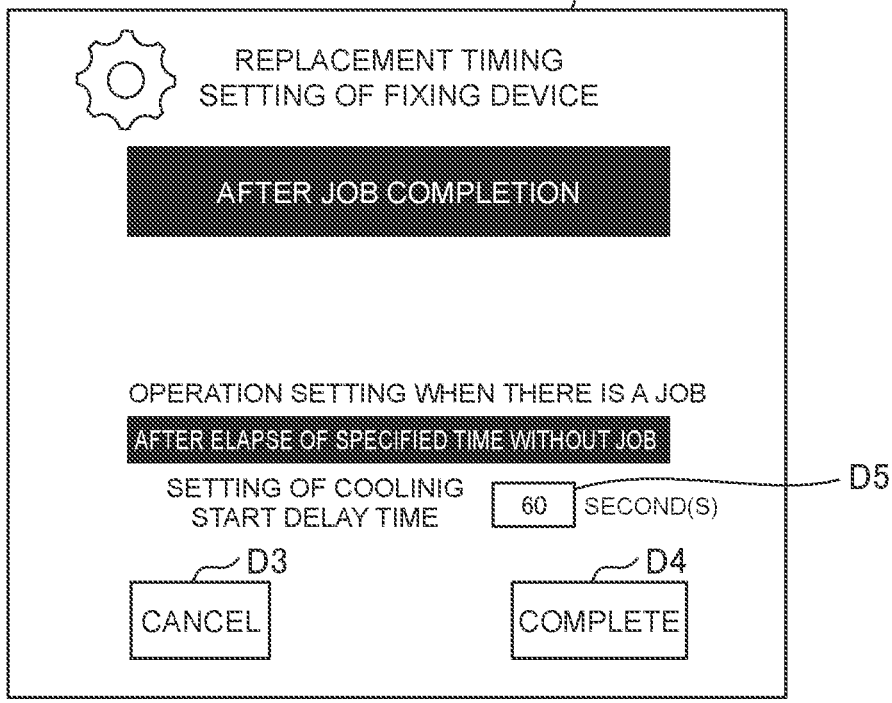
FIG. 8C is an example of the confirmation screen when the replacement timing is set to timing at which specified time has elapsed without receiving a new print job after the completion of the print job.

FIG. 8C is an example of the confirmation screen at the time of setting "After elapse of specified time without job". As shown in FIG. 8C, the characters that "Replacement timing setting of fixing device" are displayed. Further, on the confirmation screen, information indicating that "After completion of job" was selected (for example, reverse display of the character color and the background color) is displayed, and information indicating that "After elapse of specified time without job" was selected (for example, reverse display of the character color and the background color) is displayed. Further, a box D5 in which the cooling-start delay time is input is displayed on the confirmation screen. The cooling-start delay time is, as described above, time that elapses from completion of a print job without receiving a new print job. Further, on the confirmation screen, the button D3 corresponding to "Cancel" is displayed on the lower left, and the button D4 corresponding to "Complete" is displayed on the lower right. When the user touches the button D3 corresponding to "Cancel", the screen returns to the selection screen shown in FIG. 4, and when the user touches the button D4 corresponding to "Complete" after inputting the cooling-start delay time in the box D5, the setter 201 sets the replacement timing of the fixing device 60 to "After job completion" and "After elapse of specified time without job", and the setting of the replacement timing is completed.

Figure 9:
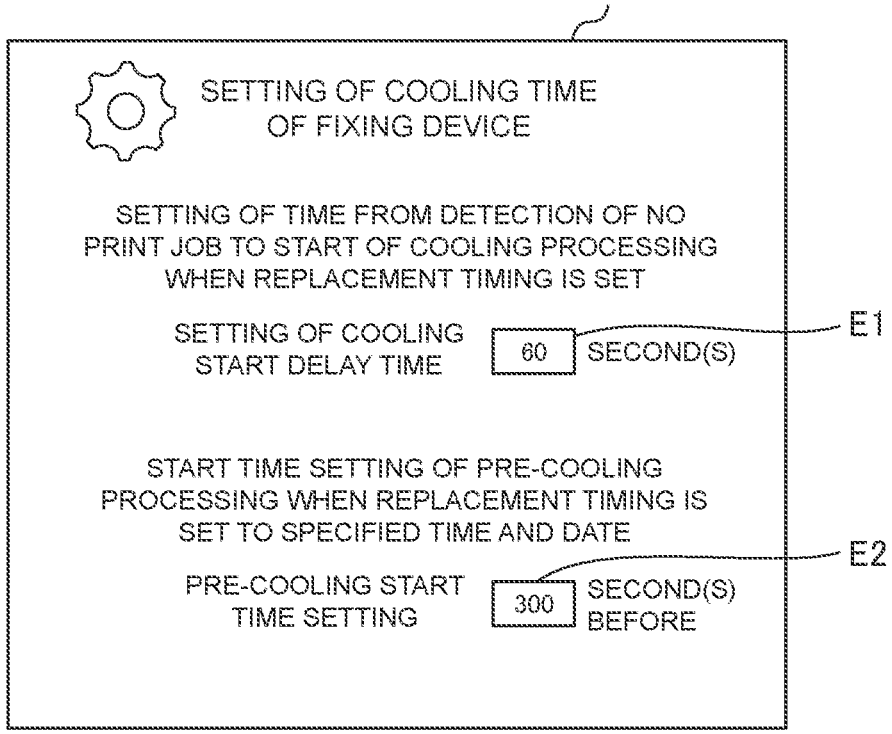
FIG. 9 is an example of a setting screen on which cooling-start delay time and start time of the pre-cooling processing are set.

The setting of the cooling time of the fixing device 60 will be explained with reference to FIG. 9. As the setting related to the cooling time, for example, cooling-start delay time can be set in the cooling processing and the pre-cooling processing, and start time can be set in the pre-cooling processing. FIG. 9 is an example of the setting screen for cooling-start delay time and start time of pre-cooling processing.

As described above, the cooling-start delay time is time set as a condition under which the pre-cooling processing (or the cooling processing) is executed, and indicates time elapsed without receiving a new print job after the completion of the print job. In this Embodiment, for example, it is set to 60 seconds.

The start time of the pre-cooling processing is time at which the execution of the pre-cooling processing is permitted and indicates a predetermined period until the replacement timing of the fixing device 60 is reached. In this Embodiment, the start time of the pre-cooling processing is set to, for example, 300 seconds before the replacement timing.

As shown in FIG. 9, on the setting screen, characters that "Setting of cooling time of fixing device" are displayed, and a box E1 in which "Cooling-start delay time" is input is displayed together with characters that "Setting of time from detection of no print job to start of cooling processing when replacement timing is set", and a box E2 in which "Pre-cooling start time" is input is displayed together with characters that "Start time setting of pre-cooling processing when replacement timing is set to specified time and date". When the user inputs "Cooling-start delay time" in the box E1, inputs "Pre-cooling start time" in the box E2, and touches a complete button (not shown) or the like, the setting related to the cooling time is completed.

Figure 10:
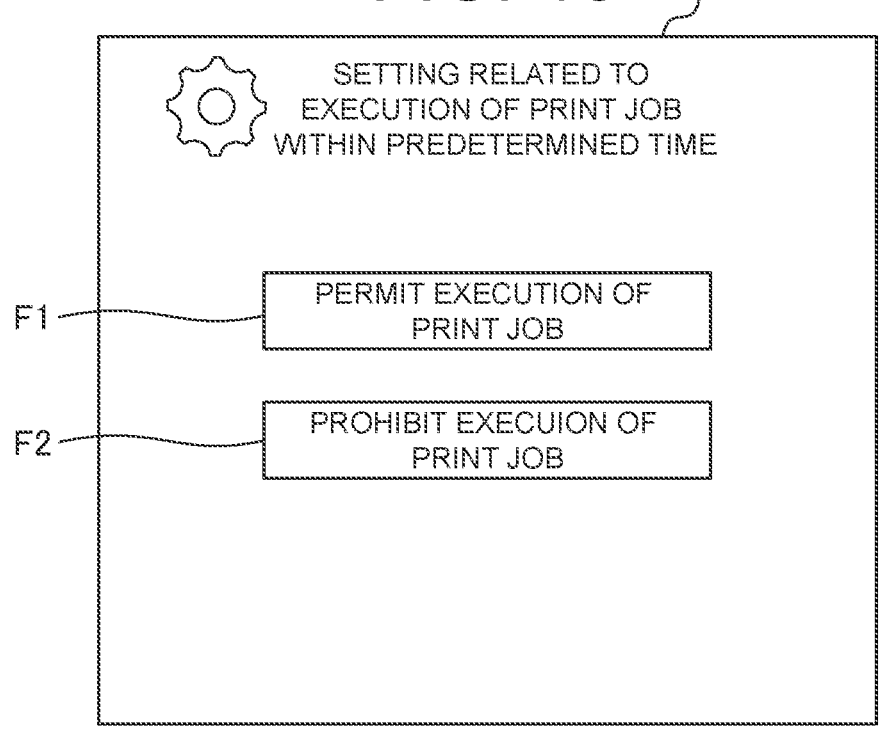
FIG. 10 is an example of a setting screen related to execution of a print job within a predetermined period.

Settings related to the execution of a print job within a predetermined period will be explained by using FIG. 10. FIG. 10 is an example of the setting screen related to execution of a print job within a predetermined period.

As shown in FIG. 10, on the setting screen, characters that "Setting related to execution of print job within predetermined period" are displayed, and a button F1 corresponding to "Permit execution of print job" and a button F2 corresponding to "Prohibit execution of print job" are displayed. When the user touches the button F1 corresponding to "Permit execution of print job", the setting indicating that the print job is to be executed within the predetermined period is made, and the setting is completed. Similarly, when the user touches the button F2 corresponding to "Prohibit execution of print job", such setting is made that the print job is not executed within the predetermined period, and the setting is completed.

Figure 11:
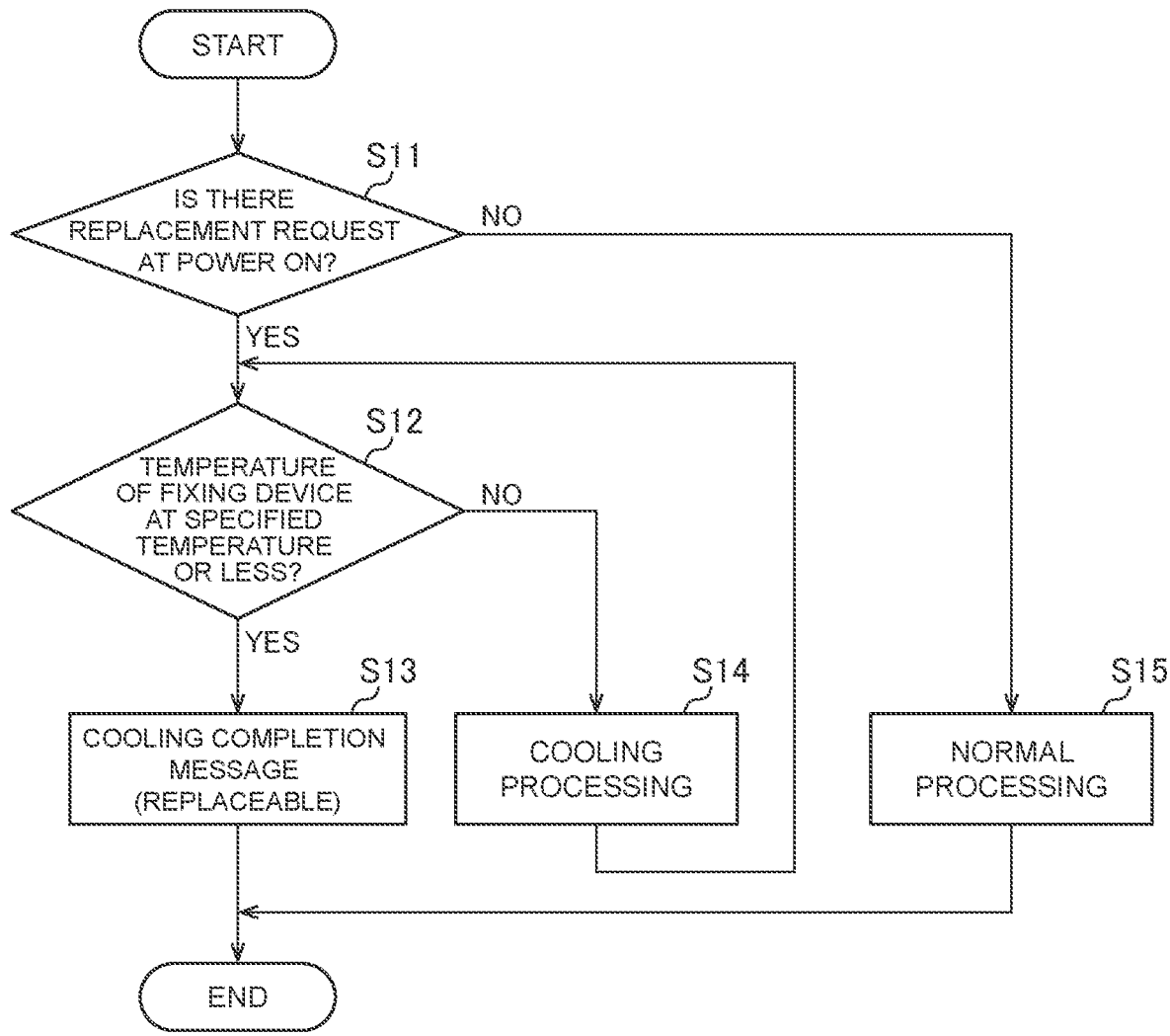

A flowchart related to the cooling control of the fixing device 60 in a case where the replacement timing is set to the time of power ON (turned on) will be described by using FIG. 11. FIG. 11 is an example of a flowchart illustrating the cooling control of the fixing device 60 in the case where the replacement timing is set to the time of power ON (turned on).

At S11, the controller 200 determines whether or not there is a replacement request at the time of power ON (turned on). That is, the controller 200 determines whether or not the replacement timing is set to the time of power ON (turned on) in the setter 201. In a case where it is determined that there is a replacement request at the time of power ON (turned on) at S11, that is, in a case of Yes at S11, the processing proceeds to S12. In a case where it is determined that there is no replacement request at the time of power ON (turned on) at S11, that is, in a case of NO S11, the processing proceeds to S15.

At S12, it is determined whether or not the temperature of the fixing device 60 is equal to or lower than a specified temperature. That is, the controller 200 determines whether or not the detection result of the temperature sensor 67 is equal to or less than a predetermined threshold value in the determiner 202. In a case where it is determined at S12 that the temperature of the fixing device 60 is equal to or lower than the specified temperature, that is, in a case of Yes at S12, the processing proceeds to S13. In a case where it is determined at S12 that the temperature of the fixing device 60 is not equal to or lower than the specified temperature, that is, in the case of No at S12, the processing proceeds to S14.

At S13, the notification processor 204 controls the operation panel 40 so as to display a message indicating that the fixing device 60 can be removed (replaced) or that the cooling of the fixing device 60 is completed, and the processing ends.

At S14, the cooling processing of the fixing device 60 is executed by the cooling processor 203, and the processing returns to S12. That is, at S14, the cooling processing of the fixing device 60 is executed until the temperature of the fixing device 60 becomes equal to or lower than the specified temperature.

Since the setting of the replacement timing by the setter 201 was not made at S15, the normal processing is executed, and the process ends.

As described above, by setting the replacement timing to the time of power ON (turned on), such a state is brought about that, when a period of power OFF is long, the temperature of the fixing device 60 unlikely becomes high and thus, the waiting time for removing the fixing device 60 (time for executing the cooling processing of the fixing device 60) can be made zero or shortened. Therefore, the fixing device 60 can be removed quickly and safely. Further, even if the power OFF period is short, by enabling the cooling processing, the temperature of the fixing device 60 can be lowered, so that the fixing device 60 can be safely removed.

Figure 12:
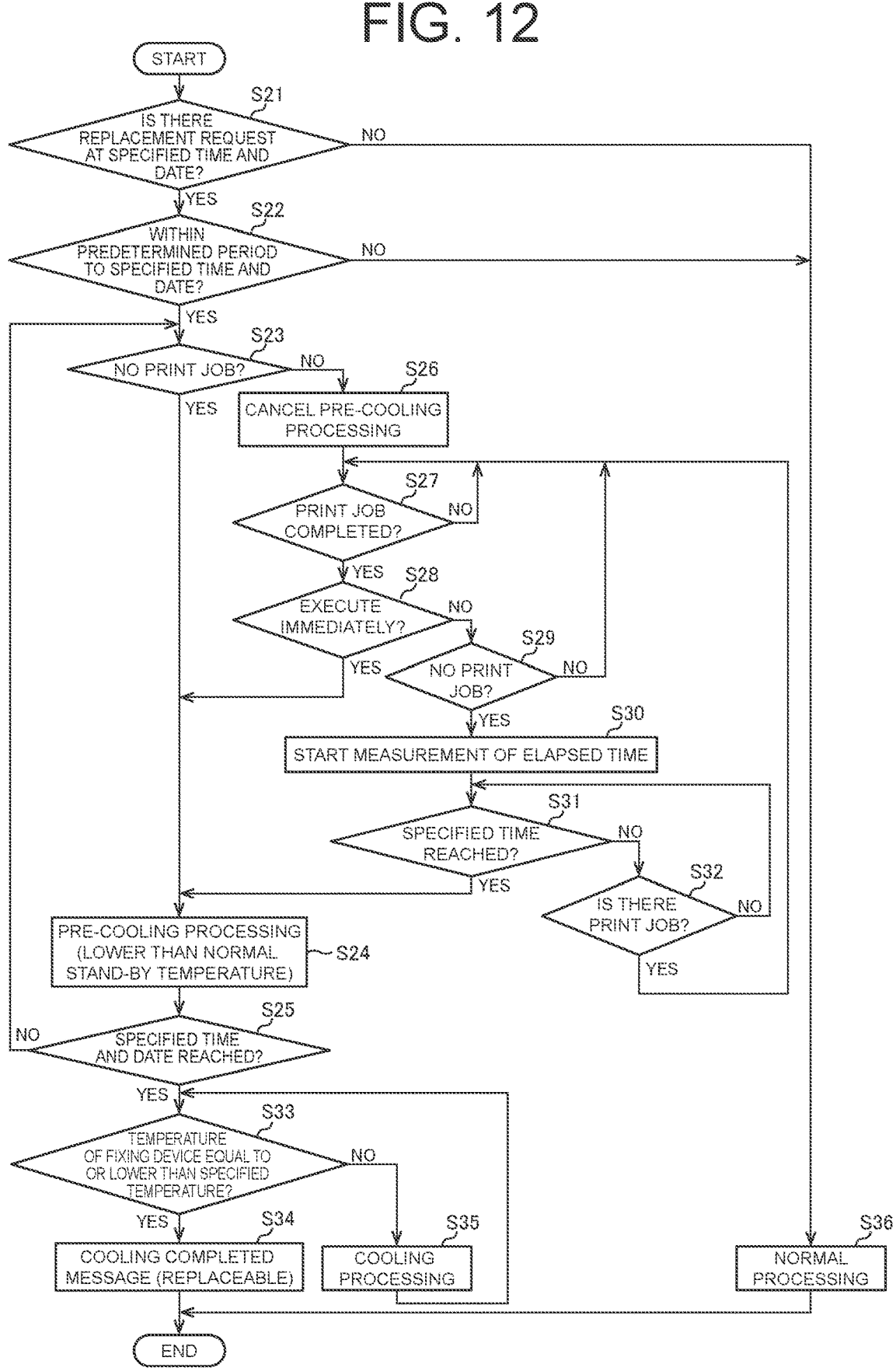
FIG. 12 is a flowchart related to the cooling control when the replacement timing is set to the specified time and date.

A flowchart related to the cooling control of the fixing device 60 when the replacement timing is set to the time and date specified by the user will be explained by using FIG. 12. FIG. 12 is an example of the flowchart illustrating the cooling control of the fixing device 60 when the replacement timing is set to the specified time and date. In the example shown in FIG. 12, it is assumed that execution of a print job within a predetermined period is permitted.

At S21, the controller 200 determines whether or not there is a replacement request at the specified time and date. That is, the controller 200 determines whether or not the replacement timing is set to the specified time and date input by the user in the setter 201. In a case where it is determined that there is a replacement request at the specified time and date at S21, that is, in a case of Yes at S21, the processing proceeds to S22. In a case where it is determined that there is no replacement request at the specified time and date at S21, that is, in a case of No at S21, the processing proceeds to S36.

At S22, the controller 200 determines whether or not the current time and date is within a predetermined period until the specified time and date are reached. Here, within a predetermined period means that, for example, the "pre-cooling start time" set on the setting screen shown in FIG. 9 has been reached. In a case where it is determined at S22 that the current time and date is within the predetermined period until the specified time and date are reached, that is, in a case of Yes at S22, the processing proceeds to S23. In a case where it is determined at S22 that the current time and date is not within the predetermined period until the specified time and date are reached, that is, in a case of No at S22, the processing proceeds to S36.

At S23, the controller 200 determines whether or not there is a print job. At S23, if it is determined that there is no print job, that is, in a case of Yes at S23, the processing proceeds to S24. At S23, if it is determined that there is a print job, that is, in a case of No at S23, the processing proceeds to S26.

At S24, the controller 200 executes the pre-cooling processing of setting the temperature of the fixing device 60 to the second temperature lower than the first temperature set during standby of the print job, and the processing proceeds to S25.

At S25, the controller 200 determines whether or not the specified time and date are reached. At S25, if it is determined that the specified time and date are reached, that is, in a case of Yes at S25, the processing proceeds to S33. At S25, if it is determined that the specified time and date have not been reached, that is, in a case of No at S25, the processing returns to S23.

At S26, if the pre-cooling processing is being executed by the controller 200, the pre-cooling processing is cancelled, and the processing proceeds to S27.

At S27, the controller 200 determines whether or not the print job is completed. At S27, if it is determined that the print job is completed, that is, in a case of Yes at S27, the processing proceeds to S28. At S27, if it is determined that the print job is not completed, that is, in a case of No at S27, the processing returns to S27.

At S28, it is determined in the setter 201 whether or not the timing at which the pre-cooling processing is executed is set to "Execution immediately after completion", that is, to the timing immediately after the completion of the print job. Setting to the timing immediately after the completion of the print job is, for example, a state in which the button B7 corresponding to "Complete" is touched on the confirmation screen shown in FIG. 6C. Further, not being set to the timing immediately after the completion of the print job means that the timing at which the pre-cooling processing is executed is set to "After elapse of specified time without job", that is, the timing after the elapse of the specified time without receiving a new print job after the completion of the print job, and for example, it is a state where the button B7 corresponding to "Complete" is touched on the confirmation screen shown in FIG. 6D. In a case where it is determined at S28 that the timing at which the pre-cooling processing is executed is set to the timing immediately after the completion of the print job, that is, in a case of Yes at S28, the processing proceeds to S24. In a case where it is determined at S28 that the timing at which the pre-cooling processing is executed is not set to the timing immediately after the completion of the print job, that is, in a case of No at S28, the processing proceeds to S29.

At S29, the controller 200 determines whether or not there is a print job. If it is determined at S29 that there is no print job, that is, in a case of Yes at S29, the processing proceeds to S30. If it is determined at S29 that there is a print job, that is, in a case of No at S29, the processing returns to S27.

At S30, the elapsed time from the completion of the print job is measured, and the processing proceeds to S31.

At S31, it is determined whether or not the elapsed time from the completion of the print job has reached the specified time (cooling-start delay time). If it is determined at S31 that the elapsed time has reached the specified time (the cooling-start delay time), that is, in a case of Yes at S31, the processing proceeds to S24. If it is determined at S31 that the elapsed time has not reached the specified time (the cooling-start delay time), that is, in a case of No at S30, the processing proceeds to S32.

At S32, it is determined whether or not there is a print job. If it is determined at S32 that there is a print job, that is, in a case of Yes at S32, the processing returns to S27. If it is determined at S32 that there is no print job, that is, in a case of No at S32, the processing returns to S31.

At S33, it is determined whether or not the temperature of the fixing device 60 is equal to or lower than the specified temperature. That is, the controller 200 determines whether or not the detection result of the temperature sensor 67 is equal to or less than a predetermined threshold value in the determiner 202. If it is determined at S33 that the temperature of the fixing device 60 is equal to or lower than the specified temperature, that is, in a case of Yes at S33, the processing proceeds to S34. In a case where it is determined at S33 that the temperature of the fixing device 60 is not equal to or lower than the specified temperature, that is, in the case of No at S33, the processing proceeds to S35.

At S34, the notification processor 204 controls the operation panel 40 so as to display a message indicating that the fixing device 60 can be removed (replaced) or that the cooling of the fixing device 60 is completed, and the processing ends.

At S35, the cooling processing of the fixing device 60 is executed by the cooling processor 203, and the processing returns to S33. That is, at S35, the cooling processing of the fixing device 60 is executed until the temperature of the fixing device 60 becomes equal to or lower than the specified temperature.

Since the setting of the replacement timing by the setter 201 was not made at S36, the normal processing is executed, and the processing ends.

As described above, by setting the replacement timing to the time and date specified by the user, the fixing device 60 can be removed at a desired timing. Further, by executing the pre-cooling processing within the predetermined period until the time and date specified by the user is reached, the temperature of the fixing device 60 can be lowered in advance before the replacement timing. Therefore, the waiting time for removing the fixing device 60 (time for executing the cooling processing) can be made zero or shortened, and smooth removal (replacement) of the fixing device 60 can be realized.

Further, the timing of executing the pre-cooling processing can be set to timing immediately after the completion of the print job or timing at which specified time has elapsed without receiving a new print job after the completion of the print job. As a result, in a case where the pre-cooling processing of the fixing device 60 is desired to be prioritized, by setting the timing of executing the pre-cooling processing to the timing immediately after the completion of the print job, the operation of cooling the fixing device 60 can be performed as quickly as possible. Further, in a case where the processing of the print job is desired to be prioritized, by setting the timing of executing the pre-cooling processing to the timing at which the specified time has elapsed without receiving a new print job after the completion of the print job, it is possible to prioritize the processing of the subsequent print job over the cooling of the fixing device 60.

It is to be noted that, in the example shown in FIG. 12, the execution of the print job within the predetermined period is permitted, but it is not limiting, and the execution of the print job within the predetermined period may be prohibited. In a case where the execution of the print job within the predetermined period is prohibited, regardless of the presence or absence of the print job at S23 shown in FIG. 12, the processing proceeds to S24, the pre-cooling process is executed, and then the processing proceeds to S25, and thus it is possible to effectively lower the temperature of the fixing device 60.

Figure 13:
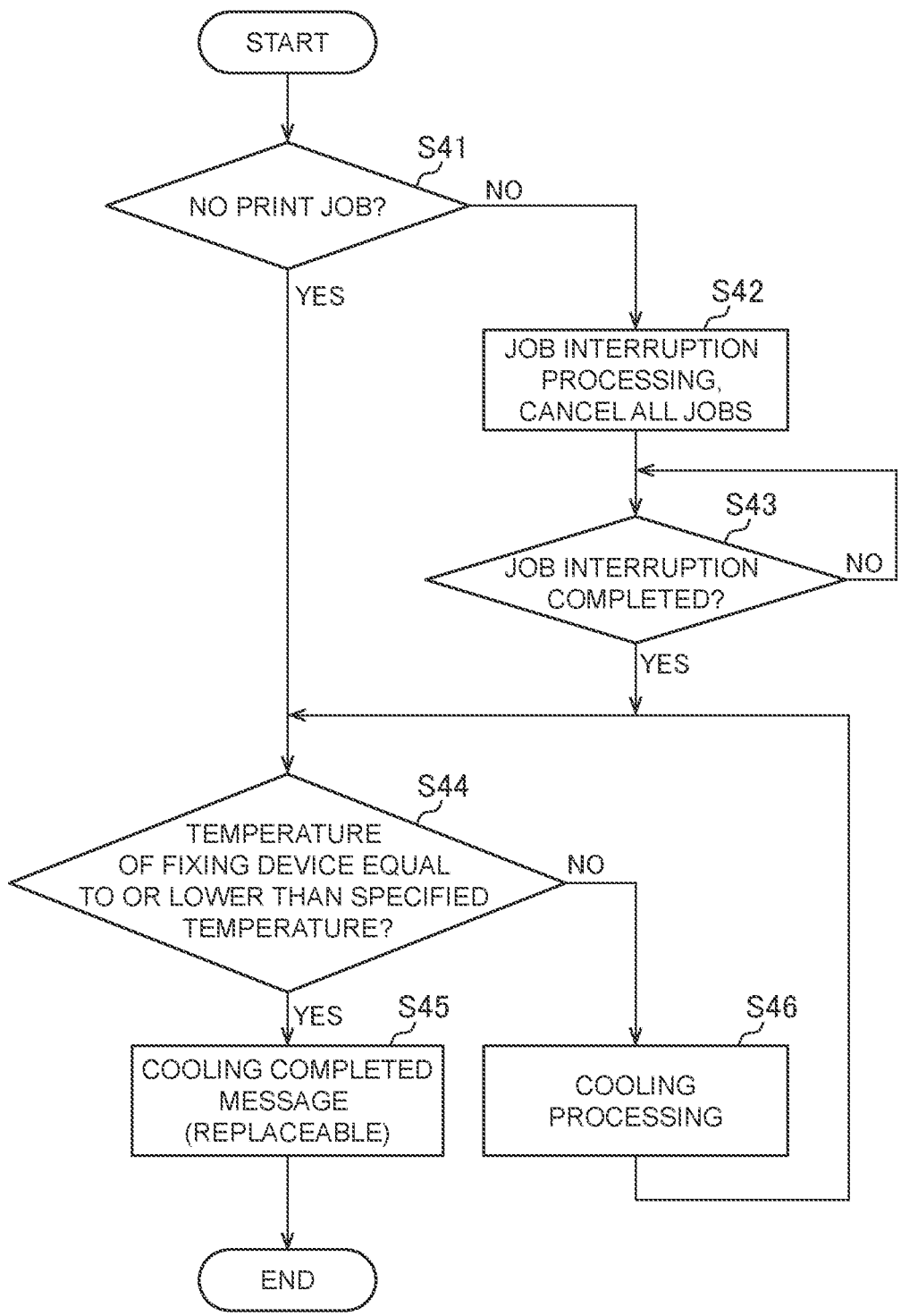
FIG. 13 is a flowchart related to the cooling control when the replacement timing is set to the current timing.

A flowchart related to the cooling control of the fixing device 60 when the replacement timing is set to the current timing will be explained by using FIG. 13. FIG. 13 is an example of a flowchart illustrating the cooling control of the fixing device 60 when the replacement timing is set to the current timing. Here, being set to the current timing means that the timing of "Execute immediately" is set, and it is a state in which the button C1 corresponding to "Complete" is touched on the confirmation screen shown in FIG. 7.

At S41, the controller 200 determines whether or not there is a print job. If it is determined at S41 that there is no print job, that is, in a case of Yes at S41, the processing proceeds to S44. At S41, if it is determined that there is a print job, that is, in a case of No at S41, the processing proceeds to S42.

At S42, the interruption processing of the print job is executed, and the processing proceeds to S43. At S42, the execution of not only the currently executed print job but also the subsequent print job shall be interrupted.

At S43, the controller 200 determines whether or not the interruption processing of a print job is completed. At S43, if it is determined that the interruption processing of the print job is completed, that is, in a case of Yes at S43, the processing proceeds to S44. At S43, if it is determined that the interruption processing of the print job is not completed, that is, in a case of No at S43, the processing returns to S43.

At S44, it is determined whether or not the temperature of the fixing device 60 is equal to or lower than the specified temperature. That is, the controller 200 determines whether or not the detection result of the temperature sensor 67 is equal to or less than a predetermined threshold value in the determiner 202. If it is determined at S44 that the temperature of the fixing device 60 is equal to or lower than the specified temperature, that is, in a case of Yes at S44, the processing proceeds to S45. If it is determined at S44 that the temperature of the fixing device 60 is not equal to or lower than the specified temperature, that is, in a case of No at S44, the processing proceeds to S46.

At S45, the notification processor 204 controls the operation panel 40 so as to display a message indicating that the fixing device 60 can be removed (replaced) or that the cooling of the fixing device 60 is completed, and the processing ends.

At S46, the cooling processing of the fixing device 60 is executed by the cooling processor 203, and the processing returns to S44. That is, at S46, the cooling processing of the fixing device 60 is executed until the temperature of the fixing device 60 becomes equal to or lower than the specified temperature.

As described above, by setting the replacement timing to the current timing, the fixing device 60 can be removed at a desired timing. Further, in a case where there is a print job, the print job is interrupted and the fixing device 60 is cooled so that the cooling of the fixing device 60 is prioritized over the processing of the print job, whereby smooth removal (replacement) of the fixing device 60 can be realized.

Figure 14:
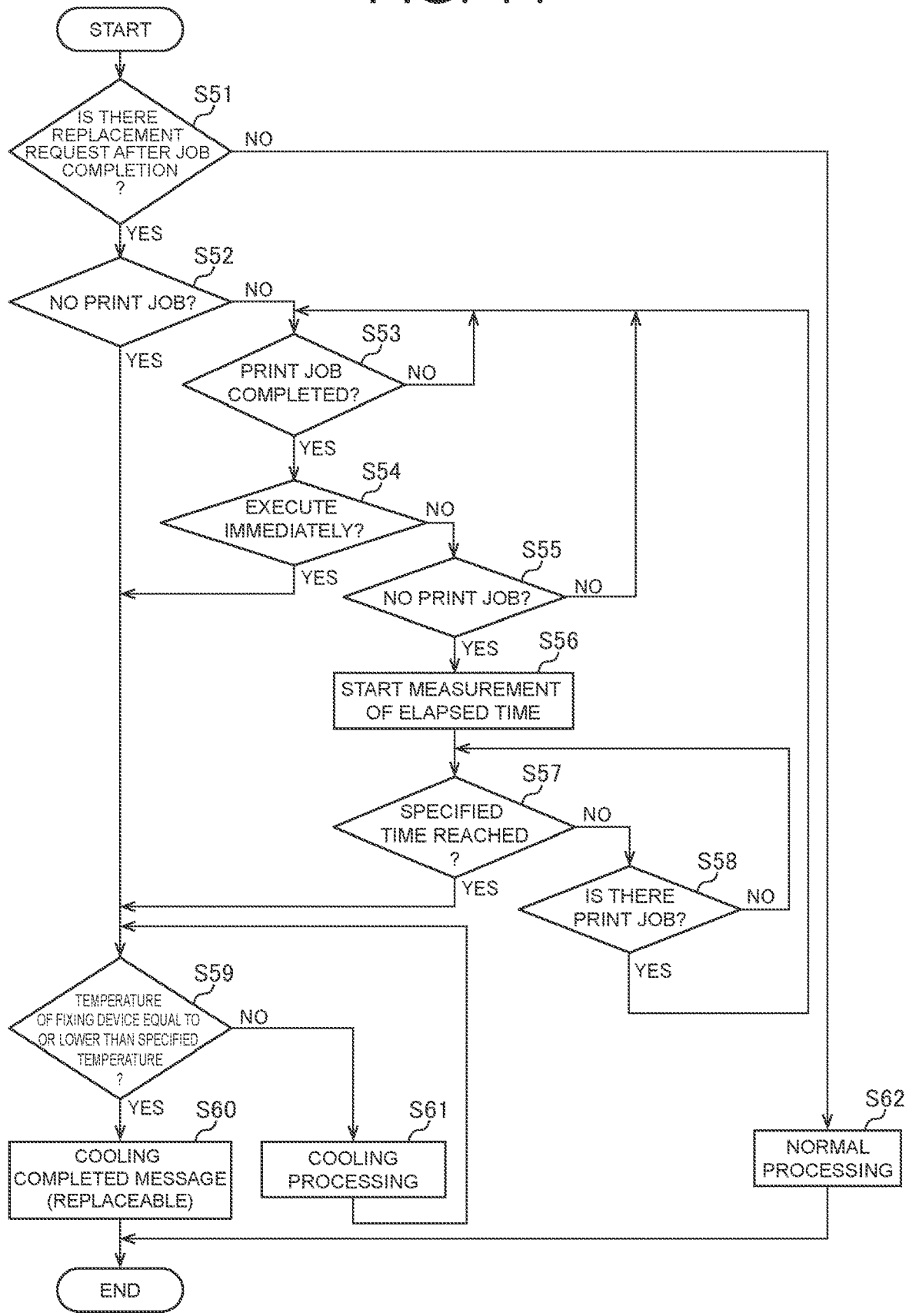
FIG. 14 is a flowchart related to the cooling control in the case where the replacement timing is set after completion of a print job.

A flowchart related to the cooling control of the fixing device 60 in a case where the replacement timing is set to after the completion of the print job will be explained by using FIG. 14. FIG. 14 is an example of a flowchart illustrating the cooling control of the fixing device 60 when the replacement timing is set to after the completion of the print job.

At S51, the controller 200 determines whether or not there is a replacement request after the completion of the print job. That is, the controller 200 determines whether or not the replacement timing is set to be after completion of the print job in the setter 201. If it is determined that there is a replacement request after the completion of a print job at S51, that is, in a case of Yes at S51, the processing proceeds to S52. If it is determined that there is no replacement request after the completion of a print job at S51, that is, in a case of No at S51, the processing proceeds to S62.

At S52, the controller 200 determines whether or not there is a print job. If it is determined at S52 that there is no print job, that is, if Yes in S52, the processing proceeds to S59. At S52, if it is determined that there is a print job, that is, if No at S52, the processing proceeds to S53.

At S53, the controller 200 determines whether or not the print job is completed. If it is determined at S53 that the print job has been completed, that is, if Yes at S53, the processing proceeds to S54. At S53, if it is determined that the print job is not completed, that is, if No at S53, the processing returns to S53.

At S54, the setter 201 determines whether or not the replacement timing is set to "Execution immediately after completion", that is, the timing immediately after the completion of the print job. Setting of the timing immediately after completion of the print job is, for example, a state in which the button D4 corresponding to "Complete" is touched on the confirmation screen shown in FIG. 8B. Further, the replacement timing not being set to the timing immediately after the completion of the print job means that the replacement timing is set to "After elapse of specified time without job", that is, timing after elapse of specified time without receiving a new print job after the completion of the print job and for example, it is a state set by touching the button D4 corresponding to "Complete" on the confirmation screen shown in FIG. 8C. If it is determined at S54 that the replacement timing is the timing immediately after the completion of the print job, that is, in a case of Yes at S54, the processing proceeds to S59. If it is determined at S54 that the replacement timing is not the timing immediately after the completion of the print job, that is, in a case of No at S54, the processing proceeds to S55.

At S55, the controller 200 determines whether or not there is a print job. If it is determined at S55 that there is no print job, that is, in a case of Yes at S55, the processing proceeds to S56. If it is determined at S55 that there is a print job, that is, in a case of No at S56, the processing returns to S53.

At S56, the elapsed time from the completion of the print job is measured, and the processing proceeds to S57.

At S57, it is determined whether or not the elapsed time from the completion of the print job has reached the specified time (cooling-start delay time). If it is determined at S57 that the elapsed time has reached the specified time (the cooling-start delay time), that is, in a case of Yes at S57, the processing proceeds to S59. If it is determined at S57 that the elapsed time has not reached the specified time (the cooling-start delay time), that is, in a case of No at S57, the processing proceeds to S58.

At S58, it is determined whether or not there is a print job. If it is determined at S58 that there is a print job, that is, in a case of Yes at S58, the processing returns to S53. If it is determined at S58 that there is no print job, that is, in a case of No at S58, the processing returns to S57.

At S59, it is determined whether or not the temperature of the fixing device 60 is equal to or lower than a specified temperature. That is, the controller 200 determines whether or not the detection result of the temperature sensor 67 is equal to or less than a predetermined threshold value in the determiner 202. If it is determined at S59 that the temperature of the fixing device 60 is equal to or lower than the specified temperature, that is, in a case of Yes at S59, the processing proceeds to S60. If it is determined at S59 that the temperature of the fixing device 60 is not equal to or lower than the specified temperature, that is, in a case of No at S59, the processing proceeds to S61.

At S60, the notification processor 204 controls the operation panel 40 so as to display a message indicating that the fixing device 60 can be removed (replaced) or that the cooling of the fixing device 60 is completed, and the processing ends.

At 61, the cooling processing of the fixing device 60 is executed by the cooling processor 203, and the processing returns to S59. That is, at S61, the cooling processing of the fixing device 60 is executed until the temperature of the fixing device 60 becomes equal to or lower than the specified temperature.

At S62, since the setting of the replacement timing by the setter 201 is not made, the normal processing is executed, and the processing ends.

As described above, by setting the replacement timing after the completion of the print job, for example, even in a state where there is a print job currently being executed, the fixing device 60 can be cooled after the completion of the print job and thus, it is not necessary to wait for the completion of the print job in front of the image forming apparatus 1, and the cooling processing of the fixing device 60 can be smoothly performed.

Further, the replacement timing can be set to timing immediately after the completion of the print job or timing when specified time has elapsed without receiving a new print job after the completion of the print job. As a result, in a case where the removal (replacement) of the fixing device 60 is desired to be prioritized, by setting the replacement timing to the timing immediately after the completion of the print job, the fixing device 60 can be replaced as quickly as possible. Further, in a case where the processing of the print job is desired to be prioritized, by setting the replacement timing to timing at which specified time has elapsed without receiving a new print job after the completion of the print job, it is possible prioritize the processing of the subsequent print job over the removal (replacement) of the fixing device 60.

In the above-described configuration, for example, a case where sheets run out, an appropriate component (door) or the like of the apparatus main body is opened, a case where the replacement timing which was set is not reached due to machine trouble or the like, and a case where the cooling processing cannot be executed even when the replacement timing is reached are assumed. For this reason, as initial setting, the replacement timing may be stored in advance in the storage 210 so that the replacement timing is at the time of power ON (turned on). If the replacement timing is set at the time of power ON (turned on), the above-described problem is less likely to occur, and it is possible to reduce possibility of missing the replacement timing and thus, it is possible to reliably remove (replace) the fixing device 60.

Further, the setting of the replacement timing shall be reset every time the above-described cooling processing is executed.

In the above-described configuration, the image forming apparatus 1 includes the apparatus main body (printing device 10) to which the fixing device 60 that thermally fixes a toner image to a recording medium (sheet) can be detachably attached, and the controller 200 that controls the apparatus main body (printing device 10). The controller 200 includes the setter 201 that sets predetermined timing as timing (replacement timing) at which the fixing device 60 is cooled so as to be detachable from the apparatus main body (printing device 10). As a result, the replacement timing can be set to, for example, the time when power is turned on, the specified time and date, or the like at which the temperature of the fixing device 60 is expected to be low, and the waiting time for removing the fixing device 60 (time for executing the cooling processing of the fixing device 60) can be made zero or shortened. Therefore, smooth removal (replacement) of the fixing device 60 can be realized at timing desired by the user.

Further, in a case where it is determined that the temperature of the fixing device 60 exceeds the specified temperature at the predetermined timing (replacement timing), the controller 200 executes the cooling processing of cooling the fixing device 60. As a result, the temperature of the fixing device 60 can be lowered so that the fixing device 60 can be safely replaced.

Further, if there is a print job being executed at predetermined timing (replacement timing), the controller 200 interrupts the print job and executes the cooling processing. As a result, the fixing device 60 can be cooled with priority over the processing of the print job.

Further, the controller 200 can set the timing at which the cooling processing is executed to the timing at which the print job is completed or the timing at which the specified time has elapsed without receiving a new print job after the completion of the print job. As a result, in a case where the cooling processing of the fixing device 60 is desired to be prioritized, by setting the timing at which the cooling processing is executed to the timing immediately after the completion of the print job, the operation of cooling the fixing device 60 can be performed as quickly as possible. Further, in a case where the processing of the print job is desired to be prioritized, by setting the timing at which the cooling processing is executed to the timing at which the specified time has elapsed without receiving a new print job after the completion of the print job, it is possible to prioritize the processing of the subsequent print job over the cooling of the fixing device 60.

Further, the controller 200 can execute the pre-cooling processing of setting the temperature of the fixing device 60 to a second temperature lower than a first temperature set at the time of waiting for a print job within a predetermined period until predetermined timing (replacement timing) is reached.

Further, in a case where there is a print job within the predetermined period, the controller 200 executes the pre-cooling processing after the completion of the print job. As a result, the temperature of the fixing device 60 can be lowered in advance before the replacement timing. Therefore, at the replacement timing, the waiting time for removing the fixing device 60 (time for executing the cooling processing) can be shortened so that smooth removal (replacement) of the fixing device 60 can be realized.

Further, in a case where there is a print job within a predetermined period, the setter 201 can set the timing at which the pre-cooling process is executed to timing at which the print job is completed or timing at which specified time has elapsed without receiving a new print job after the print job was completed. As a result, in a case where the pre-cooling processing of the fixing device 60 is desired to be prioritized, by setting the timing of executing the pre-cooling processing to the timing immediately after the completion of the print job, the operation of cooling the fixing device 60 can be performed as quickly as possible. Further, in a case where the processing of the print job is desired to be prioritized, by setting the timing at which the pre-cooling processing is executed to the timing at which the specified time has elapsed without receiving a new print job after the completion of the print job, it is possible to prioritize the processing of the subsequent print job over the cooling of the fixing device 60.

Further, the controller 200 restricts execution of a print job within a predetermined period. As a result, since the temperature rise of the fixing device 60 due to the execution of the print job can be prevented before the replacement timing, the temperature of the fixing device 60 can be lowered at the replacement timing. Therefore, at the replacement timing, the waiting time for removing the fixing device 60 (time for executing the cooling processing) can be made zero or shortened so that smooth removal (replacement) of the fixing device 60 can be realized.

Further, the predetermined timing includes at least one of the time of power-on, time and date specified by the user, current timing, and after completion of a print job.

Further, the program causes the computer to operate as the controller 200 of the image forming apparatus 1.

Further, the above-described image forming apparatus 1 can be realized by hardware, software, or a combination thereof. Here, being realized by software means being realized by a computer reading and executing a program.

The program can be stored by using various types of non-transitory computer readable media and supplied to the computer. The non-transitory computer-readable medium includes various types of tangible storage media. Examples of the non-transitory computer readable media include a magnetic recording medium (for example, a flexible disk, a magnetic tape, or a hard disk drive), a magneto-optical recording medium (for example, a magneto-optical disk), a CD-ROM (Read Only Memory), a CD-R/W, and a semiconductor memory (for example, a mask ROM, a PROM (Programmable ROM), an EPROM (Erasable PROM), a flash ROM, or a RAM (Random Access Memory)). Further, the program may be supplied to the computer by various types of transitory computer readable media. Examples of transitory computer-readable media include electric signals, optical signals, and electromagnetic waves. The transitory computer readable medium can supply the program to the computer via a wired communication path such as an electric wire and an optical fiber, or a wireless communication path.

It is to be noted that this disclosure is not limited to the above-described Embodiment, and various modifications are possible. For example, the configuration described in the above Embodiment may be replaced with substantially the same configuration, a configuration having the same operation and effect, or a configuration capable of achieving the same object.

What is claimed is:
1. An image forming apparatus comprising:
an apparatus main body to which a fixing device, that thermally fixes a toner image to a recording medium, is detachably attached; and one or more controllers that control the apparatus main body, wherein the one or more controllers set a predetermined time as a time at which the fixing device is cooled detachably from the apparatus main body, and the predetermined time includes a time and a date specified in advance by a user.

2. The image forming apparatus according to claim 1, wherein the one or more controllers execute a cooling process to cool the fixing device when a temperature of the fixing device is determined to exceed a specified temperature at the predetermined time.

3. The image forming apparatus according to claim 1, wherein the one or more controllers execute a cooling process to cool the fixing device at the predetermined time when at least a threshold period of time has elapsed after a completion of a last print job, and no new print job has been received during the threshold period of time.

4. An image forming apparatus comprising:

an apparatus main body to which a fixing device, that thermally fixes a toner image to a recording medium, is detachably attached; and one or more controllers that control the apparatus main body, wherein the one or more controllers set a predetermined time as a time at which the fixing device is cooled detachably from the apparatus main body, and the one or more controllers execute, within a predetermined period until the predetermined time is reached, a pre-cool process to reduce a temperature of the fixing device from a first temperature to a second temperature that is lower than the first temperature, wherein the first temperature is a temperature set during a standby of a print job.

5. The image forming apparatus according to claim 4, wherein, in a case that the print job is executed within the predetermined period, the one or more controllers execute the pre-cooling process after a completion of the print job.

6. The image forming apparatus according to claim 4, wherein, in a case that the print job is executed within the predetermined period, the one or more controllers set a time at which the pre-cooling process is executed to a time at which the print job is completed or a time at which a threshold period of time specified time has elapsed after a completion of a last print job, and no new print job has been received during the threshold period of time.

7. The image forming apparatus according to claim 4, wherein the one or more controllers restrict an execution of the print job within the predetermined period.

* * * * *